US012012574B2

(12) United States Patent
Glasbey et al.

(10) Patent No.: US 12,012,574 B2
(45) Date of Patent: Jun. 18, 2024

(54) PROCESS FOR REMOVING DRY SURFACE BIOFILM

(71) Applicant: Whiteley Corporation Pty. Ltd., North Sydney (AU)

(72) Inventors: Trevor Owen Glasbey, Tanilba Bay (AU); Gregory Stuart Whiteley, Queenscliff (AU)

(73) Assignee: Whiteley Corporation Pty. Ltd., North Sydney (AU)

( * ) Notice: Subject to any disclaimer, the term of this patent is extended or adjusted under 35 U.S.C. 154(b) by 0 days.

(21) Appl. No.: 16/183,322

(22) Filed: Nov. 7, 2018

(65) Prior Publication Data
US 2019/0071621 A1  Mar. 7, 2019

Related U.S. Application Data

(63) Continuation-in-part of application No. 15/035,633, filed as application No. PCT/AU2014/001039 on Nov. 11, 2014.

(60) Provisional application No. 62/587,112, filed on Nov. 16, 2017.

(30) Foreign Application Priority Data

Nov. 11, 2013 (AU) ............................... 2013904347

(51) Int. Cl.
| *C11D 3/48* | (2006.01) |
| *A01N 37/16* | (2006.01) |
| *C11D 1/14* | (2006.01) |
| *C11D 1/22* | (2006.01) |
| *C11D 1/722* | (2006.01) |
| *C11D 3/04* | (2006.01) |
| *C11D 3/06* | (2006.01) |
| *C11D 3/10* | (2006.01) |
| *C11D 3/20* | (2006.01) |
| *C11D 3/30* | (2006.01) |
| *C11D 3/34* | (2006.01) |
| *C11D 3/39* | (2006.01) |
| *C11D 3/40* | (2006.01) |
| *C11D 17/06* | (2006.01) |

(52) U.S. Cl.
CPC ................ *C11D 3/48* (2013.01); *A01N 37/16* (2013.01); *C11D 1/146* (2013.01); *C11D 1/22* (2013.01); *C11D 1/722* (2013.01); *C11D 3/042* (2013.01); *C11D 3/06* (2013.01); *C11D 3/10* (2013.01); *C11D 3/2079* (2013.01); *C11D 3/2082* (2013.01); *C11D 3/2086* (2013.01); *C11D 3/30* (2013.01); *C11D 3/3418* (2013.01); *C11D 3/3907* (2013.01); *C11D 3/40* (2013.01); *C11D 17/06* (2013.01); *C11D 3/391* (2013.01); *C11D 3/3912* (2013.01); *C11D 3/3917* (2013.01); *C11D 3/392* (2013.01)

(58) Field of Classification Search
CPC .. A01N 37/16; C11D 3/48; C11D 3/40; C11D 3/30; C11D 3/2086; C11D 3/06; C11D 3/10; C11D 3/2082; C11D 3/042; C11D 3/3907; C11D 1/146; C11D 3/3418; C11D 1/22; C11D 3/2079; C11D 1/722; C11D 17/06; C11D 3/3912; C11D 3/3917; C11D 3/391; C11D 3/392
See application file for complete search history.

(56) References Cited

U.S. PATENT DOCUMENTS

| 5,468,516 | A  | * | 11/1995 | Yamashita | ........... | C11D 11/0082 264/117 |
| 6,287,518 | B1 | * | 9/2001  | Ignacio    | ..................... | A61L 2/28 436/1 |
| 6,551,555 | B2 | * | 4/2003  | Antonoplos | ......... | G01N 31/226 436/1 |
| 2002/0004057 | A1 | * | 1/2002 | Tabasso | ................. | A01N 37/16 424/405 |
| 2003/0079758 | A1 | * | 5/2003 | Siegel | ............... | H01M 8/04089 134/3 |
| 2003/0096720 | A1 | * | 5/2003 | Huth | ......................... | A61L 2/18 510/161 |
| 2007/0197416 | A1 | * | 8/2007 | Pegelow | ............ | C11D 17/0039 510/302 |
| 2011/0177145 | A1 | * | 7/2011 | Erkenbrecher, Jr. | ... | A01N 37/16 424/405 |
| 2017/0215415 | A1 |   | 8/2017 | Reay |  |  |

FOREIGN PATENT DOCUMENTS

WO        2015066760 A1     5/2015

OTHER PUBLICATIONS

Bernhard Meyer, Approaches to Prevention, Removal and Killing of Biofilms, 51 Intl. Biodeter. Biodegrad. 249 (Year: 2003).*
Ahmad Almatroudi, et al, A New Dry-Surface Biofilm Model: An Essential Tool for Efficacy Testing of Hospital Surface Decontamination Procedures, 117 J Microbiol. Meth. 171 (Year: 2015).*
MGC Baldry, The Bactericidal, Fungicidal and Sporicidal Properties of Hydrogen Peroxide and Peracetic Acid, 54 J Appl. Bacteriol. 417, 422 (Year: 1983).*
N. Henoun Loukili, et al, Effect of Different Stabilized Preparations of Peracetic Acid on Biofilm, 63 J Hosp. Infect. 70 (Year: 2006).*
"Pluronic PE Types," BASF Technical Information 90_130218e-01 (Year: 2014).*

(Continued)

Primary Examiner — Sean M Basquill
(74) Attorney, Agent, or Firm — Pryor Cashman LLP

(57) ABSTRACT

The present invention relates to a process for removing dry surface biofilm from a surface. The process comprises: (i) dissolving a powder-based composition into water wherein the powder-based composition comprises: a) a hydrogen peroxide source, b) an acetyl donor, c) an acidifying agent, and d) a wetting agent; (ii) allowing the solution to generate a biocidally effective concentration of peracetic acid; (iii) contacting the dry surface biofilm contaminated surface with the solution of peracetic acid for a period of time; and (iv) removing the solution.

18 Claims, 9 Drawing Sheets

(56) References Cited

OTHER PUBLICATIONS

Written Opinion of the International Searching Authority in PCT/IB2018/001437 (Mar. 4, 2019).
International Search Report in PCT/IB2018/001437 (Mar. 4, 2019).
Vickery K, Deva A, Jacombs A, Allan J, Valente P, Gosbell IB; "Presence of biofilm containing viable multiresistant organisms despite terminal cleaning on clinical surfaces in an intensive care unit"; Journal of Hospital Infection, (2012) 80, 52-55.
Hu H, Johani K, Gosbell IB, Jacombs AS, Almatroudi A, Whiteley GS, Deva AK, Jensen S, Vickery K; "Intensive care unit environmental surfaces are contaminated by multidrug-resistant bacteria in biofilms: combined results of conventional culture, pyrosequencing, scanning electron microscopy, and confocal laser microscopy"; Journal of Hospital Infection. (2015) 91, 35-44.
Whiteley GS, Knight JL, Derry CW, Jensen SO, Vickery K, Gosbell IB; A pilot study into locating the bad bugs in a busy intensive care unit American Journal of Infection Control, (2015) 43, 1270-1275.
Almatroudi A, Hu H, Deva A, Gosbell IB, Jacombs A, Jensen SO, Whiteley G, Glasbey T, Vickery K; "A new dry surface biofilm model: An essential tool for efficacy testing of hospital decontamination procedures"; Journal of Microbiological Methods; (2015), 117, 171-176.
"Standard test method for quantification of *Pseudomonas aeruginosa* biofilm grown with high shear and continuous flow using CDC biofilm reactor". ASTM E2562-12. ASTM International, West Conshohocken.
Almatroudi A, Gosbell IB, Hu H, Jensen SO, Espedido BA, Tahir S, Glasbey TO, Legge P, Whiteley G, Deva A, Vickery K. "*Staphylococcus aureus* dry-surface biofilms are not killed by sodium hypochlorite: implications for infection control"; Journal of Hospital Infection, (2016), 93, 263-270.
Almatroudi A, Tahir S, Hu H, Chowdhury D, Gosbell IB, Jensen SO, Whiteley GS, Deva AK, Glasbey T, Vickery K.; "*Staphylococcus aureus* dry surface biofilms are more resistant to heat treatment than traditional hydrated biofilms", Journal of Hospital Infection (2018), 98, 161-167.
Vickery K, Pajkos A, Cossart Y.; "Removal of biofilm from endoscopes: Evaluation of detergent efficiency"; American Journal of Infection Control (2004), 32, 170-176.
Vickery K, Ngo QD, Zou J, Cossart YE.; "The effect of multiple cycles of contamination, detergent washing, and disinfection on the development of biofilm in endoscope tubing"; American Journal of Infection Control (2009), 37, 470-475.
Ren W, Sheng X, Huang X, Zhi F, Cai W. "Evaluation of detergents and contact time on biofilm removal from flexible endoscopes"; American Journal of Infection Control (2013), 41, e89-e92.
Ying Fang, Zhe Shen, Lan Li, Yong Cao, Li-Ying Gu, Qing Gu, Xiao-Qi Zhong, Chao-Hui Yu, and You-Ming Li "A study of the efficacy of bacterial biofilm cleanout for gastrointestinal endoscopes" World Journal of Gastroenterology (2010), 16, 1019-1024.
Goeres DM, Loetterle LR, Hamilton MA, Murga R, Kirby DW, Donlan RM.; "Statistical assessment of a laboratory method for growing biofilms"; Microbiology (2005) 151, 757-762.
Chen X, PS Stewart. "Chlorine penetration into artificial biofilm is limited by a reaction-diffusion interaction". Environ Sci Technol 1996;30: 2078-83.

* cited by examiner

PROCESS FOR REMOVING DRY SURFACE BIOFILM

CROSS-REFERENCE TO RELATED APPLICATIONS

The present application claims priority to U.S. provisional application Ser. No. 62/587,112, filed Nov. 16, 2017, and is a continuation-in-part of U.S. patent application Ser. No. 15/035,633, filed May 10, 2016, which is a national stage entry of PCT/AU2014/001039, filed Nov. 11, 2014, the disclosures of which are incorporated herein by reference in their entirety.

TECHNICAL FIELD

The present invention relates to a process for removing dry surface biofilm from a surface.

BACKGROUND OF INVENTION

In general, biofilms are composed of microorganisms attached to surfaces and encased in a hydrated polymeric matrix of their own synthesis. The matrix is composed of polysaccharides, proteins, and nucleic acids which are collectively termed "extracellular polymeric substances" (EPS). The EPS matrix enables cells in a biofilm to stick together and is a key element in the development of complex, three-dimensional, attached communities. Water channels are dispersed throughout biofilms, allowing the exchange of nutrients, metabolites, and waste products.

Biofilms form virtually anywhere there is water. Sites include inorganic natural and manmade materials above and below ground, on minerals and metals, including medical implant materials, and on organic surfaces such as plant and body tissues. Biofilm growth surfaces may act as an energy source, a source of organic carbon, or simply a support material. One common feature of biofilm environments is that they are periodically or continuously suffused with water.

One common example of a biofilm dental plaque, a slimy build-up of bacteria that forms on the surfaces of teeth. Similarly, the slimy layers often found on rocks in rivers and streams are also formed from biofilm.

Biofilms cause a significant amount of all human microbial infections. Nosocomial (hospital acquired) infections are the fourth leading cause of death in the U.S. with 2 million cases annually (or approximately 10% of American hospital patients) leading to more than $5 billion in added medical cost per annum. About 60-70% of nosocomial infections are associated with some type of implanted medical device. It is estimated that over 5 million medical devices or implants are used per annum in the U.S. alone. Microbial infections have been observed on most, if not all, such devices, including: prosthetic heart valves, orthopaedic implants, intravascular catheters, artificial hearts, left ventricular assist devices, cardiac pacemakers, vascular prostheses, cerebrospinal fluid shunts, urinary catheters, ocular prostheses and contact lenses, and intrauterine contraceptive devices.

Until fairly recently, the general consensus was that biofilm needed a moist or wet environment in order to develop. Normally dry surfaces were thought not to form bacterial biofilm. However, a study by Vickery et al (Reference 1) showed that biofilm could be found on normally dry surfaces. These biofilms were found to contain multiple bacteria, including *Pseudomonas* spp., *Staphylococcus aureus, Enterococcus faecium*, etc.

In this study, Vickery destructively sampled items within a decommissioned hospital intensive care unit (ICU) after it was terminally disinfected by initially cleaning with neutral detergent, followed by disinfection with 500 ppm chlorine. Following disinfection, equipment and furnishings were aseptically removed from patient and common-use areas.

Items removed were then destructively sampled using sterile gloves, forceps, pliers, scissors, or scalpel blades, depending on the material being sampled. Gloves and instruments were changed between each sample. Samples were then placed into sterile containers for transport to the laboratory. Small items, such as a sterile supply reagent box, were transported intact to the laboratory; larger items, such as the mattress and door, had sections removed into sterile containers. Following transport to the laboratory, these large pieces were further sectioned into smaller pieces, using a sterile technique.

Samples were the examined by Scanning Electron Microscopy (SEM). Biofilm was found on 5 out of 6 samples examined. Four samples had principally coccoid-shaped bacteria encased in large amounts of EPS and the sample from the curtain had 'strings' of dehydrated EPS evident.

Bacteria grew on Horse Blood Agar plates from four of the six samples, demonstrating the presence of culturable organisms. Samples taken from a venetian blind cord and curtain, shown to be positive for biofilm by SEM, also grew Methicillin Resistant *Staphylococcus aureus* (MRSA).

Re-examination of these samples after 12 months of storage under dry conditions was shown to still have viable bacteria present (Reference 2), with many of the samples still demonstrating the presence of drug resistant organisms such as MRSA, Vancomycin Resistant *Enterococcus* (VRE), Extended Spectrum Beta Lactamase (ESBL) producing organisms etc.

The fact that the presence of these dry surface biofilms is present in the hospital environment strongly suggests that they may serve as a reservoir for these resistant organisms, thus play a role in the prevalence of nosocomial infections was further provided in a study by Whiteley et al (Reference 3), in which the location of potential dry surface biofilm was determined using ATP swabbing, and the presence of resistant organisms confirmed by microbial culturing. A further study, as yet unpublished, was able to demonstrate that the organisms found in dry surface biofilm in the ICU environment were very closely related to isolates taken from patient found to be colonised with Multiply Resistant Organisms (MRO's).

It was hypothesised (see Reference 1) that dry surface biofilm can develop where surface condensation occurs, producing a thin film of water, or that the relative humidity in the ICU is high enough to allow biofilms to develop on ICU surfaces. Once formed, the EPS would protect the bacteria from desiccation and make them harder to remove.

It was further hypothesised that Multiply Resistant Organisms persist in the environment, in the face of enhanced cleaning, as biofilms. Although detergents are good at removing patient soil and planktonic bacteria, they are less effective at removing biofilm, rendering current cleaning protocols less efficient.

Another potential route to the development of dry surface biofilm on environmental high touch surfaces could be the deposition of proteinaceous solutions arising from various bodily fluids (sweat, saliva, blood) onto the environmental surface, thus allowing early colonisation by opportunistic biofilm forming micro-organisms. Repeated contact of the high touch surfaces may provide intermittent nutrients to the dry surface biofilm.

Following on from this discovery of Dry Surface Biofilm (DSBF), a laboratory model was developed by Almatroudi et al (Reference 4; incorporated herein as a reference).

Normal wet surface biofilm is typically grown in a CDC Biofilm reactor: following a standard method as described in ASTM E2562 (see Reference 5). Almatroudi modified the methodology used in ASTM E2562 to generate dry surface biofilm by incorporating prolonged periods of dehydration in between exposure of the sample coupons to growth media. In this way, the Almatroudi methodology attempts to replicate the conditions under which dry surface biofilm is thought to grow (ie exposure of the surface to occasional aqueous nutrients (cleaning chemicals, biological fluids etc) followed by extensive periods of desiccation).

Examination of the model dry surface biofilms were compared to those dry surface biofilms recovered from dry environmental surfaces and were shown to have a similar morphology and composition.

Both model and environmental dry surface biofilms were also found to differ from conventional wet surface biofilms.

Firstly, whilst the EPS of conventional biofilm (ie those found in normal, wet environments) tend to be predominantly formed from polysaccharides, the EPS of dry surface biofilm (DSBF) is notably richer in protein.

Secondly, whilst it is well known that the conventional wet surface biofilm forms a very protective environment for the bacteria embedded within the biofilm, which serves to protect the embedded bacteria from biocides such as disinfectants, antimicrobial drugs etc, dry surface biofilm appears be significantly more protective.

For example, Almatroudi et al have also demonstrated that organisms within dry surface films were remarkably resistant to treatment with chlorine, with a *Staphylococcus aureus* dry surface biofilm still showing survivors after exposure to sodium hypochlorite solution containing 20,000 ppm available chlorine (Reference 6).

Similarly, it has also been demonstrated that subjecting dry-surface biofilm to dry heat (up to 121° C. for 20 minutes) had minimal effect on the bacteria embedded within the dry surface biofilm, reducing bacterial numbers by only 2 $\log_{10}$ whilst planktonic cultures and hydrated biofilm counts were reduced over 8 $\log_{10}$ and 7 $\log_{10}$, respectively. It was further shown that it is possible to recover viable organisms after autoclaving at 121° C. for up to 30 minutes (Reference 7).

In more recent, as yet unpublished, studies into the proteomics of the various forms of biofilm produced by *Staphylococcus aureus*, significant differences in the proteins upregulated when forming differing biofilms were observed compared to the planktonic form (see Table 1 and FIG. 4). The differences in protein makeup between the various forms of biofilm are likely to account for the observes and reported differences in resistance to biocides such as chlorine, temperature and prolonged storage in the desiccated state.

TABLE 1

Proteomic study of various biofilm of *Staphylococcus aureus*

| Number of Distinct proteins | Exclusive or common | Biofilm type |
| --- | --- | --- |
| 52 | Exclusively | 3 Day wet biofilm (3 DWB)) |
| 33 | Exclusively | 12 Day wet biofilm (12 DWB) |
| 26 | Exclusively | 12 Day dry biofilm (12 DDB) |
| 15 | Common | 3 DWB + 12 DWB |
| 7 | Common | 3 DWB + 12 DDB |
| 38 | Common | 12 DWB + 12 DDB |
| 47 | Common | 3 DWB + 12 DWB + 12 DDB |

It is evident therefore that the dry surface biofilm described in References 1, 2, 3, 4, 6 and 7 represent a hitherto unrecognised surface colonisation mechanism available to many bacteria, and that this dry surface biofilm provides its embedded bacteria with enhanced protection against desiccation, exposure to biocides and even exposure to extreme temperature compared to the widely recognised wet biofilm. The presence of dry surface biofilm within healthcare facilities also clearly poses an increased risk of nosocomial infections by serving as a reservoir for pathogenic, drug-resistant organisms.

Given the increased resistance of organisms within a dry surface biofilm, there is a clear need for a means of removing the dry surface biofilm from a contaminated surface, and also killing the embedded bacteria. It is clear that the standard methods employed within healthcare establishments currently are ineffective against dry surface biofilm, as evidenced by the recovery of viable MRO's following terminal cleaning.

It has been unexpectedly found that a disinfectant product, based on a powder formulation that is dissolved in water prior to use has proven to be efficacious in both destroying bacteria within a dry surface biofilm, and also in substantially removing the protein present in the dry surface biofilm

SUMMARY OF INVENTION

Described herein is a process of removing dry surface biofilm from both environmental surfaces (floors, walls etc) as well as from non-critical medical devices such as bed-frames, infusion pump stands, infusion pump keyboards etc).

According to a broad form of the invention there is provided a process for removing dry surface biofilm from a surface, which process comprises:

(i) dissolving a powder-based composition into water wherein the powder-based composition comprises:
 a) a hydrogen peroxide source
 b) an acetyl donor
 c) an acidifying agent, and
 d) a wetting agent (ii) allowing the solution to generate a biocidally effective concentration of peracetic acid;

(iii) contacting the dry surface biofilm contaminated surface with the solution of peracetic acid for a period of time; and (iv) removing the solution.

Where the terms "comprise", "comprise" or "comprising" are used in this specification (including the claims) they are to be interpreted as specifying the presence of the stated features, integers, steps or components, but not precluding the presence of one or more other features, integers, steps or components, or group thereof.

The terminology "biocidally effective" is to be taken as meaning a substance that will effectively kill, inactivate or repel living or replicating organisms, including spores, bacteria, fungus, virus, yeasts and moulds. A solution of the composition described herein is particularly effective as a sporicide. A solution of the composition described herein is also effective against viral species, particularly blood borne viruses such as HIV, Hepatitis A, B and C. The invention will also be active against other viral species such as filoviruses (eg Ebola, Marburg) and arenavirus (Lassa), even in the presence of whole blood. The fact that peracetic acid is not deactivated by catalase makes the composition particularly useful against these latter hemorrhagic fever inducing species.

DETAILED DESCRIPTION

Figure 1:
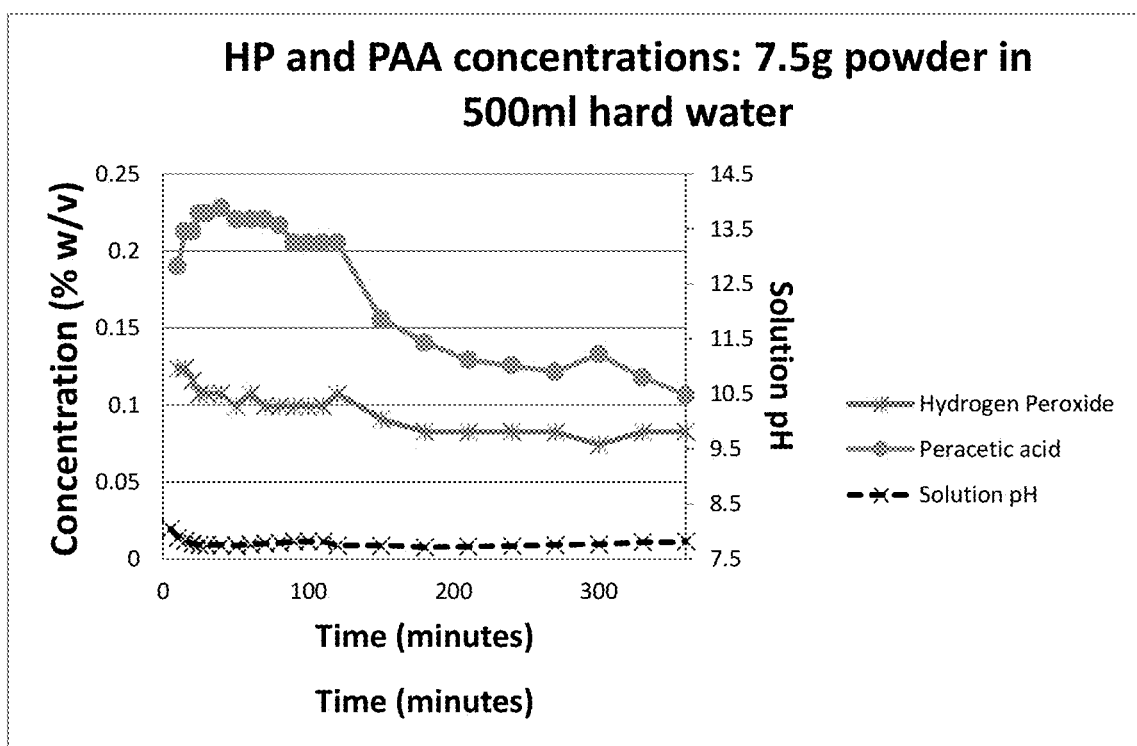
FIG. 1 is a graph showing the variation in concentrations of hydrogen peroxide and peracetic acid with time following dissolution of the composition described herein in tap water.
Figure 2:
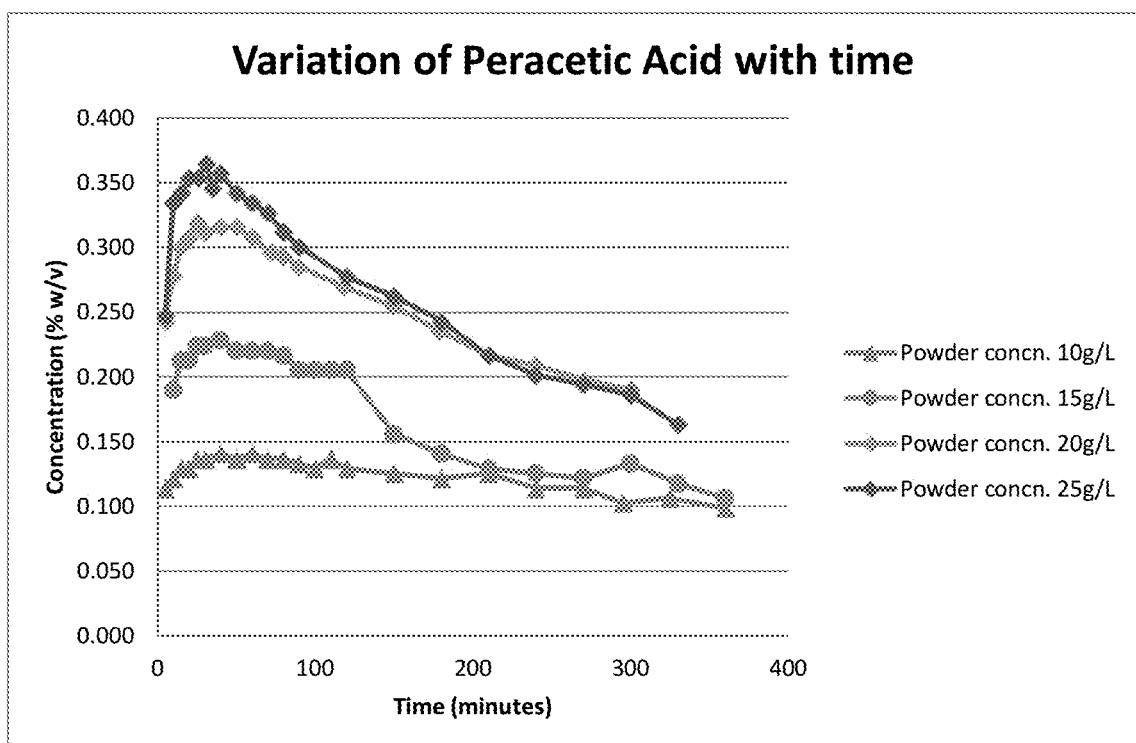
FIG. 2 is a graph showing the variation in concentrations of peracetic acid with time following dissolution of differing weights of the composition described herein in tap water.

It has unexpectedly been discovered that the disinfecting composition described in the applicant's earlier U.S. application Ser. No. 15/035,633 ('633) may be used as a dry surface biofilm remover.

U.S. Ser. No. 15/035,633, the contents of which is incorporated herein by reference, describes a composition which, on dissolution in a solvent, generates a biocidally effective disinfectant solution comprising peracetic acid and hydrogen peroxide. The composition comprises a system to produce a visual indication of the formation of the peracetic acid. The indication is provided by a dye that is rapidly bleached in the presence of peracetic acid, whilst being substantially unaffected by the presence of hydrogen peroxide. An optional second dye may be incorporated, wherein the second dye is not substantially bleached by either peracetic acid or hydrogen peroxide.

Preferably the composition of '633 is provided in a powder. Preferably the composition of '633 is dissolved in water.

When the composition of '633 is presented in powdered form, it may also contain a flow modifier to prevent clumping of the powder prior to dispersion and dissolution into the solvent, and a wetting agent to assist in the rapid dispersion and dissolution of the acetyl source into solution, preferably at ambient temperature.

The composition of '633 may also be packaged into a soluble sachet wherein the entire sachet and contents is placed into a solvent, preferably water, to generate the disinfectant, thus mitigating occupational exposure to the potentially harmful powder precursor.

In a preferred embodiment of '633, there is provided a composition comprising a hydrogen peroxide source, an acetyl donor, an acidifying agent, and a first dye that is bleached in the presence of peracetic acid, but not hydrogen peroxide. In another embodiment, a second dye that is substantially bleach-stable may also be included in the composition of '633.

In a particularly preferred embodiment of '633, the first dye is a dye that is bleached in the presence of a biocidal concentration of peracetic acid, and the second dye is a dye that is bleached after several hours in the presence of a biocidal concentration of peracetic acid. The presence of the first dye in the solution acts as a visual indication that the solution has not yet achieved the desired biocidal concentration of peracetic acid. Once the colour due to the first dye is discharged, the colour due to the second dye is left to provide an aesthetically pleasing colouration. When the composition of '633 is in powder form, it is dissolved in a solvent, preferably water, to form the peracetic acid-containing solution.

The composition of '633 may also optionally contain wetting agents, sequestering and chelating agents, and other ingredients, such as bleach-stable fragrances, corrosion inhibitors, powder flow modifiers, rheology modifiers etc.

The composition of '633 is prepared by combining the ingredients together. In a preferred embodiment, the composition of '633 is in powder form.

In an alternative embodiment, the composition of '633 may be presented in kit form, where the hydrogen peroxide source, part (a), is stored separately to a mixture of the acetyl source and peracetic acid bleachable dye, parts (b) and (c). In use, the hydrogen peroxide source is mixed with the acetyl source/peracetic acid bleachable dye mixture, in solution.

In use, the composition of '633 is dissolved in a solvent and to produce a broad spectrum disinfectant solution which is efficacious against spores, bacteria fungus, virus, yeasts and moulds. The disinfectant solution is particularly efficacious against spore forming bacteria such as *Clostridium difficile*. The disinfectant may be used to disinfect surfaces, including hard surfaces, and instruments.

It has unexpectedly been discovered that the disinfecting composition described in '633 may be used as a dry surface biofilm remover.

When a surface coated in a dry surface biofilm is contacted with a solution of peracetic acid generated by dissolving the compositions taught in '633 it has been observed that there is a significant reduction in viable bacteria, along with a substantial removal of the protein typically associated with the dry surface biofilm.

Figure 6:
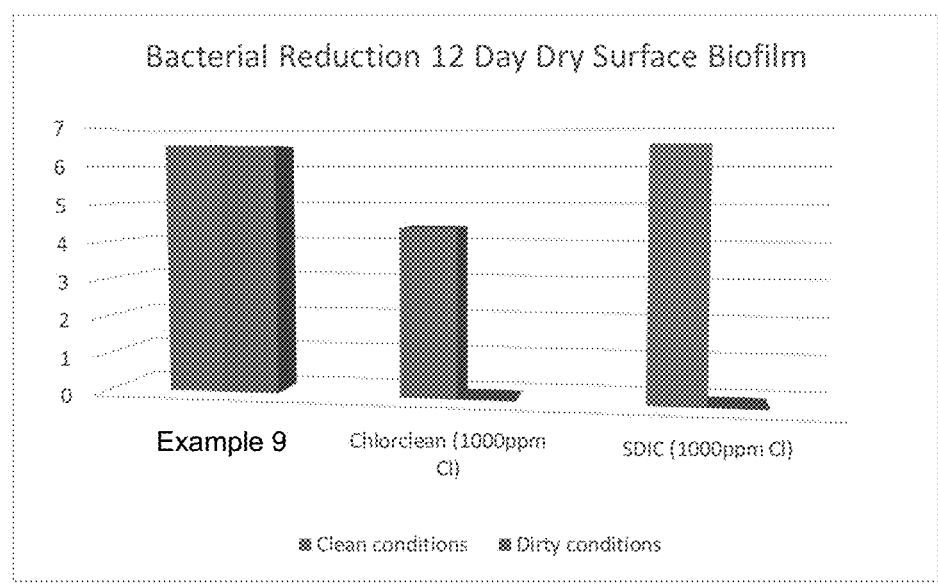
FIG. 6 shows the log reduction obtained from a disinfectant according to Example 9, Chlorclean and sodium dicloroisocyanurate (SDIC) under both clean and dirty conditions.
Figure 7:
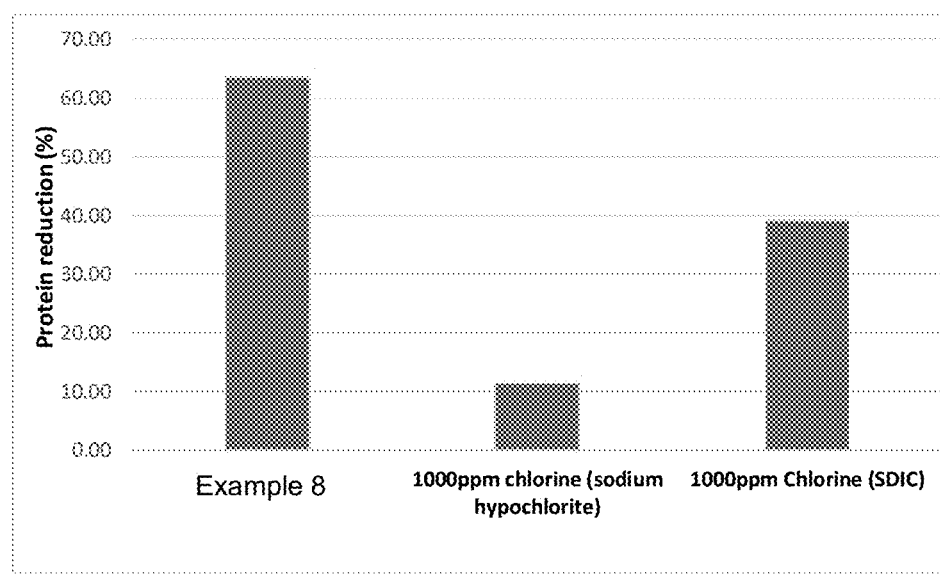
FIG. 7 shows the protein removal from a dry surface for a disinfectant according to Example 9, 1000 ppm chlorine (sodium hypochlorite) and 1000 pm chlorine (SDIC).

This observation is all the more remarkable given that detergent solutions demonstrated to remove normal, wet surface biofilm have very little effect in removing dry surface biofilm (see Example 10). In this screening test it was also observed that chlorine-based disinfectants were also effective in removing dry surface biofilm under clean conditions. However further testing showed that the presence of an organic proteinaceous soil rapidly deactivated the chlorine, and thus resulted in little or no bacterial kill (see FIG. 6). It was also observed that the chlorine-based disinfectants gave a lower removal of protein from dry-surface biofilm coated surfaces compared to the '633 solution (see FIG. 7). These observations are consistent with the observation of dry surface biofilm being found on samples removed from a decommissioned hospital Intensive Care Unit, even after terminal cleaning with a chlorine-based disinfectant (see reference 1).

The disinfecting composition described in the '633 document is a powder-based formulation comprising a hydrogen peroxide donor, and acetyl donor, along with acidifying agents, wetting agents, along with optional ingredients such as additional sequestrants and perfumes.

The compositions of '633 also contain a peracetic acid (PAA) bleachable dye to serve as an indicator as to when a biocidally active concentration of peracetic acid has been generated. For the avoidance of confusion, a biocidally active concentration of peracetic acid is defined as a concentration of peracetic acid above 1300 ppm.

Whilst the teachings of '633 are directed towards peracetic acid generating compositions containing an indicator system comprising a peracetic acid bleachable dye, a person generally skilled in the art will recognise that the presence or absence of this indicator will not affect the biocidal performance of the peracetic acid generating compositions.

The present invention is directed to a process for removing dry surface biofilm from a surface.

According to the present invention, there is provided a process for removing dry surface biofilm from a surface, which process comprises:
(i) dissolving a powder-based composition into water wherein the powder-based composition comprises:
  a) a hydrogen peroxide source
  b) an acetyl donor
  c) an acidifying agent, and
  d) a wetting agent
(ii) allowing the solution to generate a biocidally effective concentration of peracetic acid;
(iii) contacting the dry surface biofilm contaminated surface with the solution of peracetic acid for a period of time; and
(iv) removing the solution.

In other preferred embodiments, the powder-based formulation may be in the form of a tablet. In this case, the composition may also contain disintegrants. An example of a tabletted formulation is given in example 16 of '633.

Typically, the composition of '633, as used in the process of the present invention, contains the following ingredients:

Hydrogen Peroxide Source

Examples of a hydrogen peroxide source which may be used in the composition of '633 and in the present invention include, but are not limited to, sodium perborate, sodium percarbonate, urea peroxide, povidone-hydrogen peroxide, calcium peroxide, and combinations thereof.

A dilute solution of hydrogen peroxide in water may also be used as a hydrogen peroxide source, if a two part product is intended. In this case, the hydrogen peroxide solution should preferably contain less than 8% hydrogen peroxide, thus negating classification as a Class 5.1 Dangerous Good. The dilute solution of hydrogen peroxide may also contain additional stabilising ingredients, such as 1-hydroxyethylidene-1,1,-diphosphonic acid, (sold as Dequest 2010), or other strongly chelating additives, such as ethylenediamine tetraacetic acid (EDTA). The peroxide solution may optionally contain pH buffering agents.

Acetyl Donors

Examples of acetyl donors which may be used in the composition of '633 and in the present invention include, but are not limited to, tetraacetylethylenediamine (TAED), N-acetyl caprolactam, N-acetyl succinimide, N-acetyl phthalimide, N-acetyl maleimide, penta-acetyl glucose, octaacetyl sucrose, acetylsalicylic acid, tetraacetyl glycouril, and combinations thereof. Preferably the acetyl donor is a solid. The acetyl donor is understood as being an uncoated material unless otherwise indicated.

A preferred acetyl donor is TAED, more particularly, a micronized grade of TAED, such as B675, obtainable from Warwick Chemicals (UK).

Acidifying Agents

Examples of acidifying agents which may be used in the composition of '633 and in the present invention include, but are not limited to, citric acid, monosodium citrate, disodium citrate, tartaric acid, monosodium tartrate, sulfamic acid, sodium hydrogen sulphate, monosodium phosphate, oxalic acid, benzoic acid, benzenesulfonic acid, toluenesulfonic acid and combinations thereof. Preferably the acidifying agent is a solid.

Peracetic Acid Bleachable Dyes

The 'first dye' is a peracetic acid bleachable dye. Examples of peracetic acid bleachable dyes which may be used in the composition of '633 and in the present invention include Amaranth (C.I. 16185), Ponceau 4R (C.I. 16255), FD&C Yellow 6 (C.I. 15985), any other 1-arylazo-2-hydroxynaphthyl dye, and combinations thereof.

The peracetic acid bleachable dye is preferably relatively rapidly bleached in the presence of peracetic acid, but not hydrogen peroxide. By "relatively rapidly" is meant that the colour of the dye is bleached within about 10 minutes. When the colour generated by the peracetic acid bleachable dye in solution is substantially discharged, the peracetic acid has reached a biocidally effective concentration in the solution. By "substantially discharged" is meant that the colour in the solution, generated by the peracetic acid bleachable dye, is entirely, or almost entirely, discharged.

In a preferred embodiment of the composition of '633, as used in the present invention, the first dye is Amaranth Red (C.I. 16185) and the second dye is C.I. Acid Blue 182. Surprisingly, it has been found that in this embodiment, Amaranth Red is bleached rapidly by only peracetic acid, whilst being relatively resistant to bleaching by hydrogen peroxide. This is a particularly unexpected finding, as Amaranth Red is used as an indicator in a commercially available powder-based detergent called Virkon, a product produced and marketed by Antec Ltd. In the case of Virkon, as long as the red colouration due to Amaranth is present, the Virkon solution is still actively biocidal. According to the Virkon product brochure, "VIRKON 1% solutions are stable for 7 days but should be discarded when the pink colour fades".

Virkon is comprised of a mixture of potassium monoperoxysulfate, sodium chloride, sulfamic acid, plus other ingredients such as surfactants, perfumes, as well as Amaranth. According to a background document produced by Antec, on dissolution in water, the Virkon powder mix undergoes the Haber-Willstatter Reaction, producing a mix of biocidal species including the potassium monoperoxysulfate, chlorine, N-chlorosulfamic acid, hypochlorous acid. The document goes on to state that Virkon contains "a pink dye (amaranth colour, EEC No. 123). In addition to being aesthetically pleasing, this serves a very practical purpose— it indicates whether the VIRKON solution is active. In its oxidised form, it is pink but when the solution starts to lose its activity it reverts to its colourless reduced form. VIRKON solutions must always be replaced if the colour starts to fade". In other words, the pink-red colouration due to Amaranth is present whilst the active oxidatively biocidal species are also present, with the colour only fading as the oxidative biocides become depleted.

Conversely, in '633, colour depletion of the disinfectant solution indicates that an effective biocidal concentration of peracetic acid has been achieved.

Substantially Bleach-Stable Dyes

The second dye which may optionally be included in the composition of '633, as used in the present invention, is a substantially bleach-stable dye. It is recognised that peracetic acid will be capable of bleaching most dyes, and therefore reference to a "substantially bleach-stable" dye is to be taken as meaning that the dye is capable of imparting colour to the peracetic acid/hydrogen peroxide solution for at least 2 hours, preferably about 4 to 6 hours, at room temperature.

Examples of substantially bleach-stable dyes which may be used in the composition of '633 and in the present invention include, but are not limited to, Acid Blue 182, Acid Blue 80, Direct Blue 86, Acid Green 25 (C.I. 61570) and combinations thereof.

In a particularly preferred embodiment of the composition of '633, as used in the present invention, the first dye is Amaranth Red (C.I. 16185) and the second dye is C.I. Acid Blue 182. In this embodiment, the colour of the solution upon dissolution of the composition is red, generated by the Amaranth. The red colour discharges at around 5-7 minutes, at which time the peracetic acid is at a biocidally effective concentration, leaving a blue colour, generated by the Acid Blue 182. The blue colour is aesthetically pleasing, and has the added benefit of making the solution more visible when disinfecting a surface or object.

Wetting Agent

When the composition of '633, as used in the present invention, is in a powder formulation, a wetting agent may be included in the composition to facilitate dispersion of the acetyl source into solution on initial dilution, thus assisting in its dissolution. The wetting agent is preferably comprised of a solid surfactant capable of lowering the surface tension of the solvent, preferably water, thus allowing the acetyl source to wet and disperse. Preferably, the acetyl source is TAED and, in the absence of a wetting agent, a highly micronized grade of TAED such as B675 will tend to float on the surface of the solvent, and thus be slow to dissolve, resulting in slow production of peracetic acid. Examples of suitable wetting agents which may be used in the composition of the invention include, but are not limited to, sodium dodececyl sulphate, sodium alkylbenzenesulphonate, Pluronic PE6800, Hyamine 1620 etc, and combinations thereof.

pH Buffering Agents

Optionally, a pH buffer may be included in the composition of '633, as used in the present invention, to reduce the variation of pH with time. Since the formation of peracetic acid from the acetyl source, preferably TAED, requires the pH to be at, or above, the pKa of peracetic acid (8.2), the pH of the solution should be buffered between 8.00 and 9.00, preferably between 8.00 and 8.40. Suitable pH buffers which may be included in the composition of the invention include, but are not limited to, phosphate, borate, bicarbonate, TAPS (3-{[tris(hydroxymethyl)methyl]amino}propanesulfonic acid), Bicine (N,N-bis(2-hydroxyethyl)glycine), Tris (tris(hydroxymethyl)methylamine), Tricine (N-tris(hydroxymethyl)methylglycine) and combinations thereof.

Sequestering Agents

Optionally, the composition of '633, as used in the present invention, may include ingredients capable of complexing metal ions such as calcium and magnesium, thus negating any adverse effect from the use of hard water, as well as metal ions such as iron, manganese, copper etc which are capable of catalysing the decomposition of peroxides, and which also may be present in tap water. Examples of chelating and sequestering agents which may be used in the composition of the invention include, but are not limited to, sodium citrate, citric acid, phosphoric acid, sodium tripolyphosphate, EDTA, NTA, etc and combinations thereof.

Flow Modifiers

A flow modifier may be added to improve the flow characteristics of the composition of '633, as used in the present invention, when in a powder formulation. This is particularly useful if the powder is intended for supply in a unidose package (eg an individual sachet or water soluble pouch), as good powder flow will allow accurate dosing of the blended powder into the individual packs. Examples of powder flow modifiers which may be used in the composition of '633 and in the present invention include, but are not limited to, fumed silica, precipitated silica, micronized polyethylene glycol 6000, micronized lactose, talc, magnesium stearate etc, and combinations thereof.

In a preferred example, the flow modifier is a hydrophilic fumed silica, for example Aerosil 200 (Evonik Industries).

It may also possible to achieve good flow improvements using a precipitated silica such as Tixosil 38, although the precipitated silica grades are less preferred as they produce a strong haze in the final disinfectant solution, by virtue of the larger particle size of the precipitated form over the fumed form.

Perfumes

Optionally, the composition of '633, as used in the present invention, may also contain perfumes to mask the odour of peracetic acid. The perfume used should preferably be stable to hydrogen peroxide and peracetic acid.

In a preferred embodiment of the composition of '633 and as used in the process of the present invention, the acetyl donor is TAED, the hydrogen peroxide source is sodium percarbonate, the first dye is Amaranth Red, and the composition is in a powder formulation, which is dissolved in water. On initial mixing of the powder formulation with tap water, at ambient temperatures, a deep red cloudy solution is formed by the rapid dissolution of the Amaranth Red dye and the suspension of undissolved TAED. Over the course of approximately 5-10 minutes, the TAED dissolves into the water, and the red colouration is discharged as peracetic acid is generated by the reaction of the TAED with hydrogen peroxide produced by dissolution of the sodium percarbonate. After about 7-10 minutes, the solution will be clear, and all of the red colouration discharged.

In another preferred embodiment, a second dye that is substantially bleach-stable may also be included in the composition of '633, as used in the process of the present invention. Preferably the substantially bleach-stable dye bleaches over the course of 4-6 hours, along with the Amaranth. A preferred second dye, which is slowly bleached, is C.I. Acid Blue 182.

EXAMPLES

Example 1

Dye premix: A mixture of 78.00 g of TAED B675 (Warwick Chemicals), 17.00 g Amaranth dye and 5.00 g of C.I. Acid Blue 182 dye were mixed and ground together using a pestle and mortar to give a homogenous brownish powder. Once mixed, the dye premix blend was stored in a well-sealed container prior to use.

54.55 g of TAED B675, 1.00 g of the dye-TAED premix, 1.32 g of powdered sodium dodecyl sulphate and 0.60 g Aerosil 200 (a hydrophilic fumed silica available from Evonik) were mixed together, and passed through a 125 micron sieve to remove and break up any aggregated material. After sieving, mixing was continued to produce a homogenous powder.

To the sieved material was added 0.49 g tetrasodium EDTA, 28.00 g of anhydrous citric acid, 99.32 g of sodium percarbonate, 15.50 g of sodium tripolyphosphate and 1.80 g of anhydrous monosodium phosphate. The powders were then mixed thoroughly to produce a homogenous, free-flowing powder. The full composition of the powder blend is shown in Table 2, along with the function of each ingredient.

It was found that it was only necessary to add 1% of the TAED weight of the Aerosil 200 to the powder blend. This equates to 0.3% of the overall blend weight. At this level, the Aerosil will produce only a very slight haze in the final disinfectant solution.

TABLE 2

| Ingredient | % w/w | Function |
| --- | --- | --- |
| Sodium percarbonate | 49.03 | Hydrogen peroxide source |
| TAED B675 | 27.31 | Acetyl donor |
| Citric acid | 13.82 | Acidifier |
| Sodium tripolyphosphate | 7.65 | Sequestrant and pH modifier |
| Monosodium phosphate | 0.89 | pH modifier |
| Sodium dodecyl sulfate | 0.65 | Surfactant and wetting agent |
| Aerosil 200 | 0.30 | Flow modifier |
| Tetrasodium EDTA | 0.24 | Chelating agent |
| Amaranth | 0.084 | PAA bleachable Colourant |
| Acid Blue 182 | 0.025 | PAA stable Colourant |

A solution of the disinfectant was prepared by dissolving 7.50 g of the powder blend into 500 ml of artificial hard water containing 340 ppm $CaCO_3$ (prepared as described in SOP Number: MB-22-00: Standard Operating Procedure for Disinfectant Sample Preparation, published by the US Environmental Protection Agency Office of Pesticide Programs, and hereafter referred to as AOAC Hard Water). The solution was stirred at room temperature. The red colour due to the Amaranth was observed to be discharged at around 5-7 minutes, leaving a blue solution.

10 ml aliquots taken at regular intervals after 10 minutes, and the pH were also recorded. The aliquots were titrated to determine hydrogen peroxide and peracetic acid concentration.

As may be seen in FIG. 1, the concentration of peracetic acid increases rapidly, reaching its maximum value at around 20 minutes. After this point, a slow decay of the peracetic acid concentration over several hours is seen.

Interestingly, if the concentration of powder dissolved into the water is increased, whilst the maximum peracetic acid concentration increases as expected, it was also observed that its decomposition rate was also increased (see FIG. 1). It was also observed that the maximum concentration of peracetic acid from each powder concentration was reached at the 20 minute mark.

Example 2

4 disinfectant solutions in AOAC Hard Water were prepared using differing concentrations of the powder blend from Example 1, and stirred for 20 minutes. Aliquots were taken and titrated for hydrogen peroxide and peracetic acid concentration, whilst further aliquots were inoculated with suspensions of both vegetative and spore forms of *Clostridium sporogenes* (ATCC 3584), in the presence of 5% horse serum. The organisms were exposed for 3, 5 and 10 minutes. Each sample was tested in triplicate, and each sample gave greater than a 6 log reduction in viable organisms at each time point.

Table 3 shows the concentration of the solutions used, the concentrations of both hydrogen peroxide and peracetic acid, along with the log reductions recorded.

TABLE 3

| | Concentrations (ppm) | | Contact Time | | |
| --- | --- | --- | --- | --- | --- |
| | H2O2 | PAA | 3 minute | 5 minute | 10 minute |
| Vegetative cells | | | | | |
| Sample 1 (20 g/L) | 1382 | 2964 | >6 log | >6 log | >6 log |
| Sample 2 (16 g/L) | 1330 | 2550 | >6 log | >6 log | >6 log |
| Sample 3 (12 g/L) | 980 | 1980 | >6 log | >6 log | >6 log |
| Sample 4 (8 g/L) | 569 | 1349 | >6 log | >6 log | >6 log |
| Bacterial spores | | | | | |
| Sample 1 (20 g/L) | 1382 | 2964 | >6 log | >6 log | >6 log |
| Sample 2 (16 g/L) | 1330 | 2550 | >6 log | >6 log | >6 log |
| Sample 3 (12 g/L) | 980 | 1980 | >6 log | >6 log | >6 log |
| Sample 4 (8 g/L) | 569 | 1349 | >6 log | >6 log | >6 log |

Example 3

7.50 g of the powder blend from Example 1 was taken, and added to 500 ml of tap water, and stirred at room temperature. The time the red colour was discharged was noted, and a 5 ml aliquot taken and titrated. A further 5 ml aliquot was removed and titrated after 20 minutes.

As can be seen in Table 4, the colour due to Amaranth was being removed between 7 and 8 minutes, with the peracetic acid content at this time being between 0.14 and 0.16%.

TABLE 4

| | Time for Amaranth dye | Dye bleach time | | 20 min | |
| --- | --- | --- | --- | --- | --- |
| Sample | bleaching | HP | PAA | HP | PAA |
| 1 | 8 min | 0.13% | 0.14% | 0.11% | 0.21% |
| 2 | 7 min 50 sec | 0.141 | 0.155 | 0.124 | 0.22% |
| 3 | 7 min | 0.13% | 0.16% | 0.11% | 0.23% |

As can be seen in Table 3, solutions containing at least 1.35% (1349 ppm) peracetic acid exhibit sporicidal activity, thus it may be safely assumed that once the red colouration due to Amaranth has been discharged, the peracetic acid content will be above this sporicidally active concentration.

Example 4

Differing weights of the powder blend from Example 1 were taken, and added to 500 ml of tap water, and stirred at room temperature. The time the red colour was discharged for each solution is shown in Table 5.

TABLE 5

| Weight of powder (g) | Weight of AOAC Hard water (g) | Time taken for discharge of red colour (minutes) |
|---|---|---|
| 6.00 | 500 | 7.5 |
| 7.02 | 500.02 | 7 |
| 8.02 | 500.01 | 6.5 |
| 9.00 | 500 | 6 |
| 10.03 | 499.99 | 5.25 |

Example 5

A quantity of the powder blend from Example 1 was taken, and packaged into individual sachets prepared from heat sealed PVA water soluble film. The sachets were prepared by heat sealing two sheets of 50 micron thick PVA film (width 4.65 cm, length 8 cm), together to form an envelope, dispensing approximately 8.2 g powder into each envelope and then sealing the open side to give the finished filled sachet.

A single sachet was then taken and added to a stirred quantity of tap water (500 ml). The sachet was observed to wrinkle in the water, and then to burst open, releasing the contained powder into the water to give a deep red solution. After approximately 8 minutes, the red colour was discharged, leaving a pale blue solution with a faint odour of peracetic acid. Aliquots of the resultant solution were taken at 10 and 20 minutes and titrated for hydrogen peroxide and peracetic acid content.

Assessment of an initial production run to produce sachets is shown in Table 6, and Table 7 shows the result of assessing peracetic acid generation from several sample sachets dissolved into 500 ml tap water.

TABLE 6

| mean sachet weight | 8.29 |
|---|---|
| Standard deviation | 0.514 |
| % RSD | 6.2 |
| Maximum weight | 9.59 |
| Minimum weight | 7.48 |
| sample size | 70 |

TABLE 7

| sachet | | 10 minutes | | | 20 minutes | |
|---|---|---|---|---|---|---|
| | wt (g) | pH | H2O2 % | PAA % | pH | H2O2 % | PAA % |
| 1 | 8.3 | 8.39 | 0.146 | 0.145 | 8.26 | 0.121 | 0.223 |
| 2 | 8.48 | 8.12 | 0.138 | 0.171 | 8.07 | 0.127 | 0.215 |
| 3 | 8.74 | 8.54 | 0.163 | 0.175 | 8.23 | 0.127 | 0.229 |
| 4 | 7.78 | 8.23 | 0.125 | 0.175 | 8.16 | 0.107 | 0.208 |
| 5 | 8.16 | 8.2 | 0.14 | 0.109 | 8.1 | 0.124 | 0.2 |
| 6 | 9.1 | 8.33 | 0.161 | 0.214 | 8.23 | 0.148 | 0.198 |
| 7 | 7.67 | 8.21 | 0.133 | 0.192 | 8.12 | 0.116 | 0.16 |
| 8 | 8.11 | 8.12 | 0.132 | 0.078 | 7.99 | 0.118 | 0.205 |
| mean | 8.29 | 8.27 | 0.14 | 0.16 | 8.15 | 0.12 | 0.20 |

Example 6

A quantity of the powder blend according to Example 1 was taken, and packaged into individual sachets prepared from heat sealed PET-paper-Aluminium-PP laminate. The sachets were prepared by heat sealing a sheet of laminate 6 cm wide to form a cylindrical tube, and then sealing across the tube to form a stick, which was then dosed with the powder blend via an auger doser. The open end of the filled tube was then sealed to give a stick pack.

The mean gross weight of each stick pack was found to be 8.88 g, with a standard deviation of 0.27 (see Table 8). The packaging material was found to weigh 0.88 g, thus giving a mean net weight for the powder of 8.00 g.

TABLE 8

| mean sachet weight | 8.88 |
|---|---|
| Standard deviation | 0.27 |
| % RSD | 3.06 |
| Maximum weight | 9.66 |
| Minimum weight | 8.13 |
| sample size | 500 |

To demonstrate homogeneity of blending, sample sachets were taken from various parts of a production run and added to 500 ml of tap water. The hydrogen peroxide and the peracetic acid content at 10, 20 and 30 minutes for each solution were then determined.

Figure 3:
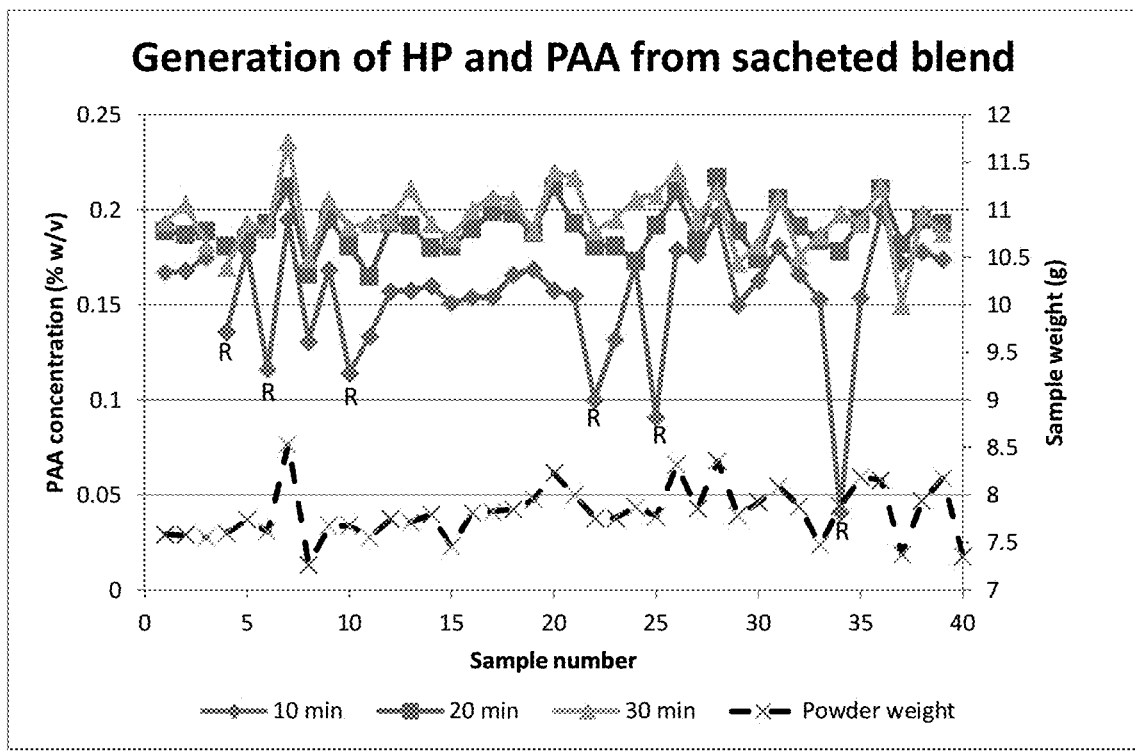
FIG. 3 is a graph showing the peracetic acid (PAA) concentration generated for various samples of sachets of the composition described herein, dissolved in tap water, at 10 minutes, 20 minutes and 30 minutes.
Figure 4:
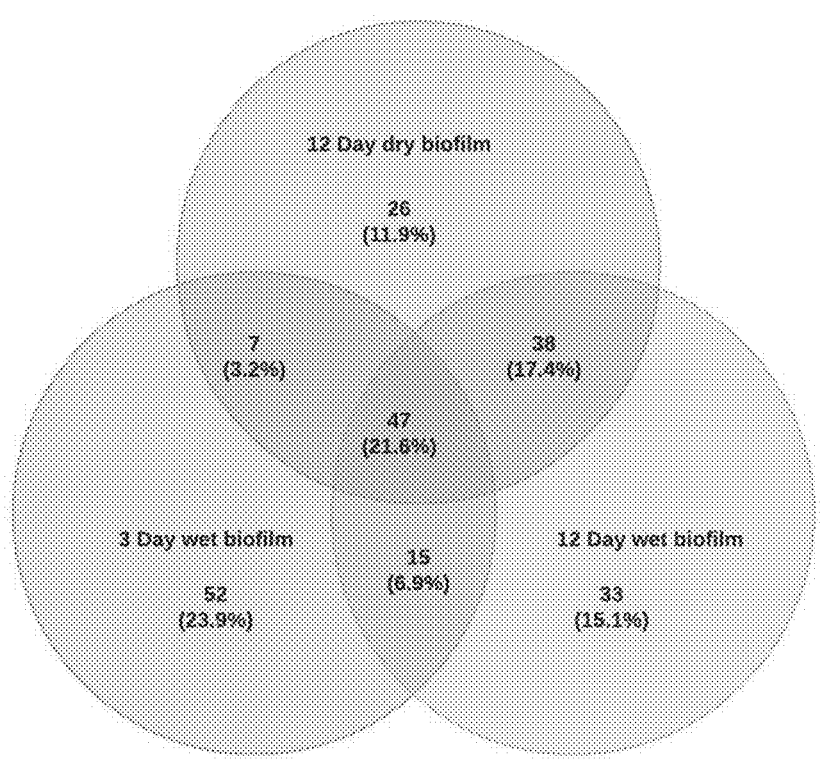
FIG. 4 shows a Venn diagram outlining the differences in numbers of distinct upregulated proteins in various biofilms of *Staphylococcus aureus*.
Figure 5:
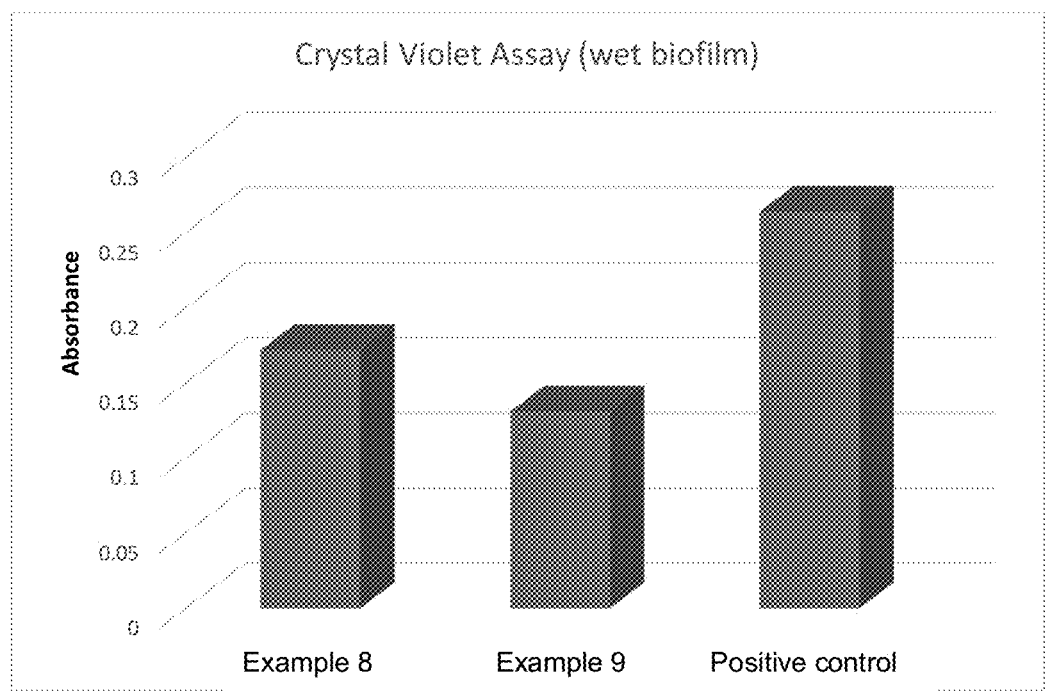
FIG. 5 shows the results of a Crystal Violet assay for the removal of wet biofilm using differing cleaning products

As can be seen in FIG. 3, the hydrogen peroxide and peracetic acid content at 10 minutes was highly variable, and was found to be dependent on stirring speed etc. In some cases, the solutions were observed to still be red at the 10 minute mark (indicated by the letter R in FIG. 3), and these solutions were all associated with a low peracetic acid content. It should be noted that by 20 minutes, the variation in concentrations of hydrogen peroxide and peracetic acid were significantly reduced.

This example demonstrates the utility of the dye system as an indicator for the presence of an effective biocidal concentration of peracetic acid.

This was further illustrated by adding 7.50 g of the powder blend according to Table 9 to 500 ml of AOAC Hard water and testing its biocidal activity against surface bound micro-organisms in an AOAC Hard Surface Carrier Test 991.47, 48 and 49, conducted in the presence of 5% horse serum against *Pseudomonas aeruginosa, Staphylococcus aureus* and *Salmonella choleraesuis*. The test methodology was modified to use a 5 minute contact time rather than the prescribed 10 minute contact time.

TABLE 9

| Test organism | No. carriers tested | No. Carriers Negative | No. Carriers Positive | Result |
|---|---|---|---|---|
| *Pseudomonas aeruginosa* ATCC 15442 | 60 | 57 | 3 | PASS |
| *Staphylococcus aureus* ATCC 6538 | 60 | 58 | 2 | PASS |
| *Salmonella choleraesuis* ATCC 10708 | 60 | 60 | 0 | PASS |

The powder formulation can also be modified for the production of tablets capable of generating peracetic acid on dissolution into water. Preferably, a means to facilitate the disintegration of the tablet is incorporated into the tablet formulation. This also assists the slower dissolution of the tablet due to the compression required to generate the tablet.

Poly-NVP based disintegrants such as Disintex 200 (ISP Technologies Inc) were found to be impractical for use, as the cross-linked polymer adsorbed the dyes strongly, and thus gave highly coloured particulate material in the final solution. A preferred means of disintegrating the tablet is to include additional sodium carbonate into the formulation, along with additional acidifying agent. In a more preferred embodiment, sulfamic acid is used as the acidifying agent as this lacks a pKa above 2. If citric acid is used as an acidifying agent in the tablet formulation, then gas formation, hence tablet disintegration, is slowed down once the solution reached a pH of around 6 due to the third pKa of citric acid.

Example 7

A powder blend according to Table 10 was produced by mixing the ingredients together to produce a homogenous mix. In order to achieve adequate tablet formulation, the mixture was not sieved, and care was taken not to reduce the particle size of the soda ash, sodium percarbonate and the sulfamic acid.

TABLE 10

| | |
|---|---|
| TAED | 13.54 |
| sodium percarbonate | 37.15 |
| sulfamic acid | 30.82 |
| Dense soda ash | 18.06 |
| Sodium dodecyl sulfate | 0.23 |
| Tetrasodium EDTA | 0.15 |
| Amaranth | 0.038 |
| Cl Acid Blue 182 | 0.011 |

Once blended, the material was tableted using a single punch tablet press, fitted with a 20 mm die set to give tablets with a mean weight of 3.72 g. The mean thickness of the tablets was 9.1 mm, with a thickness to weight ratio of 0.41.

Two tablets, with a combined weight of 8.34 g were then dissolved in 200 ml of tap water. After stirring for 25 minutes at room temperature, three 10 ml aliquots were removed and titrated. The mean concentrations for hydrogen peroxide and peracetic acid were found to be 0.293% and 0.258% respectively.

An additional tablet was taken and dissolved into AOAC Hard water, and then tested for antimicrobial activity against *Clostridium difficile* in the presence of 5% horse serum at 20° C., using the method of BS EN 1276 (1997). The resultant observed log reductions are shown in Table 11.

TABLE 11

| Test organism: *Clostridium difficile* | Contact time (temperature = 20° C.) | | |
|---|---|---|---|
| ATCC70992 | 1 | 5 | 10 |
| Log reduction (initial inoculum level 4.8 × 10⁶ | 2.77 | >5.86 | >5.86 |

Example 8: Production of Model Dry Surface Biofilm Samples

Dry surface biofilm was produced in the surfaces of coupons following the method described by Almatroudi et al. in Reference 4.

*Staphylococcus aureus* ATCC 25923 biofilm was grown on 24 removable, sterile Pyrex coupons in an intensively cleaned, brushed and steam sterilised (121° C. for 20 min) CDC biofilm reactor (BioSurface Technologies Corp, Bozeman, USA).

Semi-dehydrated biofilm was grown over 12 days with cycles of batch growth during which time 5% tryptone soya broth (TSB) was supplied alternating with prolonged dehydration phases at room temperature (22-25° C.) as described in Table 12, with the TSB being removed from the Biofilm Reactor at the end of each batch phase.

The biofilm generator was located in an air-conditioned laboratory and filter-sterilised room air (average relative humidity 66%) was pumped across the media surface at an airflow rate of 3 l/min using an aquarium air pump.

Biofilm development was initiated by inoculation of about $10^8$ colony forming units (CFU) of *S. aureus* at the beginning of the first batch phase. During batch phases, all biofilms were grown in 5% TSB at 35° C. and subjected to shear by baffle rotation at 130 rpm/min producing turbulent flow.

TABLE 12

| Stage | Culture conditions | Cumulative time |
|---|---|---|
| 1 | 48 h batch phase in 5% TSB followed by 48 h dehydration | 96 hr |
| 2 | 6 h batch phase in 5% TSB followed by 66 h dehydration | 168 hr |
| 3 | 6 h batch phase in 5% TSB followed by 42 h dehydration | 216 hr |
| 4 | 6 h batch phase in 5% TSB followed by 66 h dehydration | 288 hr |

Following growth of the biofilm, the rods holding the biofilm coated coupons were removed from the generator, and placed in 1 litre of phosphate buffered saline (PBS) for 5 minutes. The three coupons on each rod were then removed, and washed an additional two times by placing them in to 50 ml PBS before being placed in individual sterile Bijou containers. The number of CFU per coupon was determined by sonication of a randomly selected coupon in an ultrasonic bath (Soniclean, JMR, Australia) for 5 min and vigorous shaking for 2 min in 4 ml of media followed by sequential 10-fold dilution and plate count.

Example 9: Peracetic (PAA) Based Disinfectant

A sachet containing 8.5 g of a disinfectant powder composition similar to Example 1. The disinfectant powder comprised a blend of a hydrogen peroxide source (sodium percarbonate) and an acetyl source (tetraacetylethylenediamine (TAED)), along with acidifying agents (citric acid) and sequestrants (monosodium phosphate, sodium tripolyphosphate), along with a peracetic acid bleachable dye (amaranth). The formulation used is given in Table 13.

TABLE 13

| Ingredient | % w/w | Function |
|---|---|---|
| Sodium percarbonate | 49.18 | Hydrogen peroxide donor |
| TAED B675 | 27.39 | Acetyl donor |
| Citric acid | 13.86 | Acidifier |
| Sodium tripolyphosphate | 7.67 | Sequestrant |
| Sodium phosphate | 0.89 | pH modifier |
| Sodium dodecyl sulfate | 0.65 | Wetting agent |
| Tetrasodium EDTA | 0.24 | Chelating agent |
| Amaranth | 0.08 | PAA bleachable colourant |
| Acid Blue 182 | 0.03 | PAA stable colourant |

The sachet was added to 500 ml water and stirred at room temperature for 10-15 minutes, after which time the colouration provided by the peracetic acid bleachable dye was discharged. At this point the solution will contain between 1500 and 2000 ppm peracetic acid, along with about 1000-

1300 ppm hydrogen peroxide. The resultant solution was found to be active against a range of bacteria, viruses, spores and fungi for approximately 8 hours after dissolution.

Example 10: Initial Screening Study Using TOC to Assess Removal of Dry Surface Biofilm In an initial screening study, a range of cleaning products were assessed for their dry surface biofilm removing efficacy by assessment of Total Organic Carbon (TOC). The products assessed, and their in-use concentrations are shown in Table 14.

TABLE 14

| Detergent | Supplier | Dilution |
|---|---|---|
| Fabrisan | Whiteley Corporation | Used undiluted |
| Matrix | Whiteley Corporation | 1:25 |
| Zip Strip | Whiteley Corporation | 1:6 |
| Phensol | Whiteley Corporation | 1:50 |
| Example 9 | Whiteley Corporation | 17 g per litre |
| Sodium hypochlorite | Fronine Pty Ltd, | 1000 ppm available chlorine |
| 1M Sodium hydroxide solution | Chem Supply Ltd | Used undiluted |
| Negative control (water) | | Used undiluted |

Fabrisan is marketed as a carpet spotter. Its ingredients include sodium citrate, sodium dodecyl sulfate, and Tea Tree Oil. The formulation is according to Example 3 of U.S. Pat. No. 5,610,189

Matrix is marketed as a wet surface biofilm remover. The formulation is according to Australian patent no. AU200127559962, and its efficacy against normal (wet) biofilm has been described by Vickery et al (Reference 8 and Reference 9), Ren et al (Reference 10) and Fang et al, (Reference 11). The Ren and the Fang references were performed using Intercept, which has an identical formulation to Matrix and is manufactured under license from Whiteley Corporation by Medivators Inc.

Zip Strip is a floor stripper intended to remove polymeric sealants form vinyl floors. The formulation comprises a highly alkaline solution of surfactants, butyl glycol, and ethanolamine.

Phensol is a phenolic disinfectant comprising a blend of o-phenylphenol and benzyl chlorophenol with the sodium salt of a (C10-16) Alkylbenzenesulfonic acid.

Each cleaning solution was diluted according to the label directions, as shown in Table 14.

A 12 day dry surface biofilm was grown on Pyrex glass coupons as described in Example 8. Three coupons, coated in dry surface biofilm were then placed into 25 ml of each test product solution. Three coupons were also placed in 25 ml of MilliQ water to serve as a negative control. A 1M solution of sodium hydroxide was used as a positive control.

Each sample was prepared and tested in duplicate.

Blank coupons, in which fresh, clean coupons were exposed to the test products were also produced, in order to assess any adherence of organic materials (such as surfactants) to the coupons, were also analysed.

After exposure to the test product solution for the required time, the coupons were rinsed twice in 25 ml Milli-Q water. The Total Organic Carbon on each coupon was then measured using a Shimadzu-5000A TOC analyser. The TOC resulting from any residual biofilm left after cleaning was calculated by subtracting the TOC found on the blank coupons from the TOC resulting from the residual carbon left on the biofilm coated coupons after cleaning.

The results are given in Table 15. The percentage TOC remaining due to the biofilm shown in parentheses were calculated relative to the negative control (Milli-Q water).

TABLE 15

| | TOC (µg) | | | |
|---|---|---|---|---|
| | Blank coupons | Coupons with Biofilm | TOC due to biofilm | % Reduction |
| Fabrisan | 1.13 | 4.77 | 3.64 | 51 |
| Matrix | 0.82 | 6.87 | 6.05 | 18 |
| Zip Strip | 1.16 | 5.33 | 4.17 | 43 |
| Phensol | 0.76 | 3.45 | 2.69 | 64 |
| Example 9 | 0 | 0.47 | 0.47 | 94 |
| Chlorine 100 ppm | 0.34 | 1.87 | 1.53 | 79 |
| 1M NaOH | 0.17 | 0.16 | −0.01 | 100 |
| Negative control | 0.06 | 7.43 | 7.37 | 0 |

From this screening study, it can be clearly seen that products demonstrated to be efficacious in the removal of normal, wet surface biofilm (ie Matrix) do not show the same degree of efficacy against dry surface biofilm. Apart from the 1M sodium hydroxide solution, the two most efficacious cleaning solutions were Example 9 and Chlorine.

Example 11

The efficacy of removal of wet biofilm was assessed for both Example 9 and Matrix, a product demonstrated to remove wet surface biofilm.

A wet *Staphylococcus aureus* biofilm was grown on plastic tiles supported on modified rods in a CDC Biofilm Reactor over 48 hours, following the methodology of Goeres et al (Reference 12).

The plastic tiles were then placed into Falcon tubes containing Matrix (at a 1:25 dilution in water), Example 9 (17 g/L in water) and Milli-Q water. The tiles were left immersed in the cleaning solutions for 10 minutes. After 10 minutes the tiles were removed, washed twice with Milli-Q water, and then placed into 40 ml of a 0.3% solution of Crystal Violet, (a stain for biofilm). The tiles were then stood for 90 minutes in the Crystal Violet solution. After 90 minutes, the tiles were removed, washed for 1 minute three times in Milli-Q water. The washed tiles were then scraped, and eluted with 5 ml of 95% ethanol into a 28 ml vial, which was then closed and stood overnight to elute the adsorbed Crystal Violet. The absorbance of the solutions were then read via a spectrophotometer.

TABLE 16

| Cleaning product | Absorbance |
|---|---|
| Example 9 | 0.128 |
| Matrix | 0.120 |
| Milli-Q water | 0.191 |

As can be seen in Table 16, Matrix removed most biofilm from the tile as shown by the lower absorbance due to Crystal Violet.

Example 12

The efficacy of protein removal of Example 9 and Matrix was demonstrated as follows:

12 day biofilm was grown on PET coupons following the methodology of Example 8. The rods containing the biofilm coated coupons were then removed and any loosely bound biofilm washed off with Milli-Q water as described in Example 8.

One rod holding three dry surface biofilm coated coupons was then placed into 30 ml of a solution of Example 9 (17 g/litre) for 10 minutes. A second rod was placed into 30 ml of a solution of Matrix (1:50 dilution), and a third rod placed into 30 ml Milli-Q water to serve as a positive control. An additional rod, holding 3 uncoated coupons was sterilized and used as a negative control.

After 10 minutes, each rod was placed into 30 ml of 1M sodium hydroxide solution to elute off all remaining protein. Aliquots from each solution were then taken and tested for protein using a Bicinchroninic Acid (BCA) assay, using a micro BCA test kit (Sigma Aldrich).

In order to perform the BCA assay, a series of standard solutions of bovine serum albumin were prepared to produce a standard curve. 1 ml of each of the standard BCA solutions, along with 1 ml aliquots taken from the cleaning solutions were all then treated with 1 ml of a working BCA solution prepared by mixing 50 ml Bicinchononic acid (Sigma Aldrich cat. B9643) into a beaker, and adding 1 ml of 4% copper (II) sulfate solution (Sigma Aldrich cat. No. C2284). The samples were then incubated for 60 minutes at 60° C., and the absorbance at 562 nm read using a spectrophotometer (see Table 17).

TABLE 17

| Sample | Absorbance | Derived concentration (ppm) | Percentage reduction of protein |
|---|---|---|---|
| Concn. BSA (ppm) | | | |
| 0 | 0 | | |
| 0.5 | 0.027 | | |
| 1 | 0.042 | | |
| 2.5 | 0.085 | | |
| 5 | 0.144 | | |
| 10 | 0.32 | | |
| 20 | 0.682 | | |
| 40 | 1.209 | | |
| Test samples | | | |
| Example 9 | 0.249 | 0.249 | 66.4 |
| Matrix | 0.362 | 0.362 | 50.5 |
| Water | 0.721 | 0.721 | 0.0 |

As can be seen, Example 9 gives a significantly higher reduction of protein than Matrix when tested against 12 day dry surface biofilm.

Example 13

The efficacy of protein removal from coupons coated in 12 day dry surface biofilm using Example 9, 1000 ppm sodium hypochlorite solution and Chlorclean, (a sodium diisocyanurate (SDIC) tablet formulated with adipic acid and a sodium toluenesulfonate and marketed as a 2-in-1 Hospital Grade Disinfectant with detergent action by Helix Solutions (Canning Vale South, Western Australia) were assessed as described in Example 11. Both chlorine solutions were shown to give 1000 ppm, available chlorine. In this test a 10 minute contact time was used. Percentage reductions were calculated from the positive control (Milli-Q water).

As can be seen in Table 18, Example 9 gives the highest protein reduction. Chlorclean, a formulated SDIC tablet marketed as a 2-in-1 cleaning/disinfecting product was also observed to be more efficacious than sodium hypochlorite solution.

TABLE 18

| Detergents tested | Percentage protein reduction |
|---|---|
| 1000 ppm Chlorine (sodium hypochlorite) | 11.50 |
| 1000 ppm Chlorine (Chlorclean tablet) | 39.26 |
| Example 9 (17 g/L) | 63.65 |

Example 14

In order to determine whether the presence of detergent moieties within the cleaning products were responsible for the difference in performance between sodium hypochlorite and the proprietary Chlorclean tablet, the methodology of example 13 was repeated, only with the sodium hypochlorite solution being replaced with a solution of sodium diisocyanurate, giving 1000 ppm available chlorine.

TABLE 19

| Detergents tested | Percentage reduction |
|---|---|
| 1000 ppm Chlorine (SDIC) | 17.65 |
| 1000 ppm Chlorine (Chlorclean tablet) | 13.12 |
| Example 9 (17 g/L) | 64.69 |

Of note here is the marked reduction in efficacy of Chlorclean with the shorter contact time. The protein reduction observed with the Example 9 was observed to be substantially the same despite the difference in contact times.

Example 15

The bacterial reductions obtained from a 12 day dry surface biofilm were assessed under clean conditions using Example 9, Chlorclean tablets and a generic SDIC tablet Each test product was dissolved in water.

Coupons coated in 12-day dry surface biofilm were produced as per Example 8. 2 ml of each test solution, followed by 2 ml of water were added to the wells in a tissue culture plate.

After a 5 minute contact time, coupons were removed from the disinfectant solutions, rinsed twice using 30 ml phosphate buffered saline for 5 seconds, and then placed into 5 ml tubes containing 2 ml of a neutralizer solution comprising 6% Tween 80 plus 1% sodium thiosulfate plus 5% bovine serum plus 10% Bovine Serum Albumin.

The tubes were sonicated for 20 minutes and then vortexed for 2 minutes. Serial 10-fold dilutions were then made and 100 ul of neat, $10^{-1}$, $10^{-2}$, $10^{-3}$ and $10^{-4}$ dilutions were plated on Horse Blood Agar plates. The plates were incubated at 37° C. overnight and then enumerated.

Control coupons, not exposed to disinfectant were similarly worked up to allow the log reductions to be calculated As can be seen in Table 20, the disinfectant according to Example 9 gave the largest log reduction of biofilm.

TABLE 20

|  | Log reduction | Neutraliser control |
| --- | --- | --- |
| Example 9 | 6.556 | 0.0437 |
| Chlorclean (1000 ppm Cl) | 4.411 | 0.017 |
| SDIC (1000 ppm Cl) | 6.55 | 0.045 |

Example 16

The bacterial reductions obtained from a 12 day dry surface biofilm were assessed under dirty conditions using Example 9, Chlorclean tablets and a generic SDIC tablet. Each test product was dissolved in artificial hard water containing 340 ppm $CaCO_3$ to which was added 5% Bovine Calf Serum.

Coupons coated in 12-day dry surface biofilm were produced as per Example 8. 2 ml of each test solution, followed by 2 ml of hard water to which was added 5% bovine calf serum were added to the wells in a tissue culture plate.

After a 5 minute contact time, coupons were removed from the disinfectant solutions, rinsed twice using 30 ml phosphate buffered saline for 5 seconds, and then placed into 5 ml tubes containing 2 ml of a neutralizer solution comprising 6% Tween 80 plus 1% sodium thiosulfate plus 5% bovine serum plus 10% Bovine Serum Albumin.

The tubes were sonicated for 20 minutes and then vortexed for 2 minutes. Serial 10-fold dilutions were then made and 100 ul of neat, $10^{-1}$, $10^{-2}$, $10^{-3}$ and $10^{-4}$ dilutions were plated on Horse Blood Agar plates. The plates were incubated at 37° C. overnight and then enumerated.

Control coupons, not exposed to disinfectant were similarly worked up to allow the log reductions to be calculated.

As can be seen in Table 21, the disinfectant according to Example 9 gave a log reduction essentially equivalent to that seen under clean conditions (see Table 20). It was also observed that both chlorine tablets gave essentially no log reduction of bacteria, suggesting complete neutralisation of the chlorine disinfectant by the proteinaceous soil.

TABLE 21

|  | Log reduction | Neutraliser control |
| --- | --- | --- |
| Example 9 | 6.531 | 0.010 |
| Chlorclean (1000 ppm Cl) | 0.002 | 0.005 |
| SDIC (1000 ppm Cl) | 0.007 | 0.018 |

Example 17

In this example, the disinfectant according to Example 9 was tested against planktonic *S. aureus*, and compared to two commercially obtained oxidising disinfectants, Chlorclean and Oxivir Tb (Diversey Australia Pty Ltd, Smithfield, NSW, Australia), a ready to use solution comprising 0.5% hydrogen peroxide, formulated with other proprietary ingredients.

Alongside these commercial products some generic equivalents were also tested. These comprised Proxitane (Solvay Interox, Botany, NSW, Australia), an equilibrium solution of hydrogen peroxide, acetic acid and Peracetic acid containing 27% hydrogen peroxide, 7.5% acetic acid and 5% of peracetic acid, an unformulated SDIC tablet (Redox Chemicals, Minto, NSW Australia) that released 1000 ppm chlorine on dissolution in 10 litres of water, and a 6% solution of hydrogen peroxide (Gold Cross, Biotech Pharmaceuticals Pty Ltd, Laverton North, Victoria, Australia). These generic products were selected to try to match the active ingredients in the formulated product, thus assess the role of the product formulation.

Where applicable, the disinfectant products were diluted using artificial hard water prepared by dissolving 0.304 g anhydrous ($CaCl_2$) and 0.065 g anhydrous $MgCl_2$ in distilled water to make one litre of hard water.

Table 22 shows the products tested, and the concentrations of active materials in the test samples.

TABLE 22

| Product | Sample preparation | Concentration of active ingredients |
| --- | --- | --- |
| Example 9 | 8.5 g powder dissolved in 500 ml hard water | 1100 ppm hydrogen peroxide 2200 ppm PAA |
| Chlorclean | 1 tablet dissolved in 1 litre hard water | 1000 ppm chlorine |
| Oxivir Tb | Used undiluted | 0.5% (5000 ppm) Accelerated ® hydrogen peroxide |
| Generic equivalents | | |
| Proxitane | 4 ml Proxitane diluted to 100 ml with hard water | 10,080 ppm hydrogen peroxide 2,200 ppm PAA |
| 20 g SDIC tablets | 1 tablet dissolved in 10 litres hard water | 1000 ppm chlorine |
| 6% hydrogen peroxide | 10 ml diluted to 100 ml with hard water | 0.6% (6000 ppm) hydrogen peroxide |

Disinfectant efficacy in the absence of soil was tested by mixing 1 ml of test disinfectant with 1 ml of hard water and immediately adding 10 µl of Tryptone Soy Broth (TSB) containing approximately $10^9$ planktonic bacteria for 5 minutes contact time. 1 ml neutralizer (1% Na-thiosulphate, 6% Tween 80, 5% BCS and 10% BSA in PBS) was then added.

Disinfectant efficacy in the presence of soil was tested by mixing 1 ml of test disinfectant with 1 ml of 5% bovine calf serum in hard water and immediately adding 10 µl of Tryptone Soy Broth (TSB) containing approximately $10^9$ planktonic bacteria for 5 minutes contact time for 5 minutes contact time. prior to the addition of 1 ml of neutralizer. 1 ml neutralizer (1% Na-thiosulphate, 6% Tween 80, 5% BCS and 10% BSA in PBS) was then added Testing of these disinfectant systems against planktonic *S. aureus* showed that each one was capable of achieving a 7 $log_{10}$ reduction in the absence of organic soil. However, when tested under dirty conditions, only Example 9 retained its full efficacy.

Figure 8:
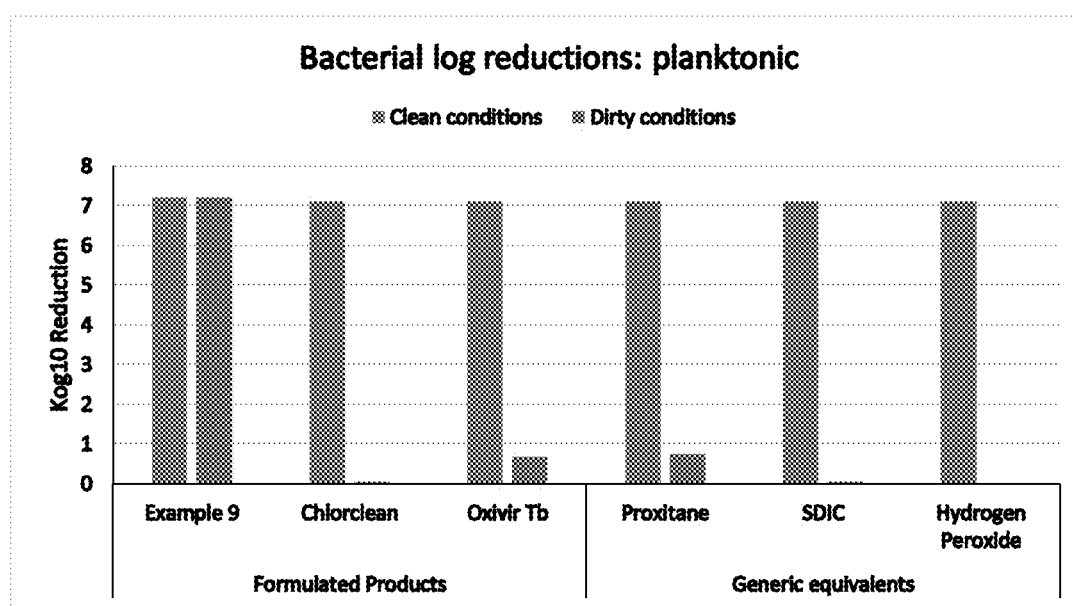
FIG. 8 shows the bacterial reduction of a range of disinfectants against planktonic *Staphylococcus aureus*.

As can be seen in FIG. 8, the presence of the organic soil completely deactivated the two chlorine-based disinfectants and the hydrogen peroxide. Oxivir Tb however did exhibit some activity (0.67 $log_{10}$). It is noted that in this study Oxivir Tb was tested with a contact time of 5 minutes, whereas its manufacturers recommendations is for a 10 minute contact time with bacteria.

Example 18

The efficacy of the test disinfectants shown in Table 22 to kill the organisms within a dry surface biofilm of *S. aureus* was determined in the presence and absence of biological soil. Each condition was tested with five replicates for determining residual bacterial number (colony forming units—CFU) using a 5-minute contact time.

Disinfectant efficacy in the absence of soil was tested by mixing 1 ml of test disinfectant with 1 ml of hard water and immediately adding a biofilm coated coupon for 5 minutes contact time. 1 ml neutralizer (1% Na-thiosulphate, 6% Tween 80, 5% BCS and 10% BSA in PBS) was then added.

Disinfectant efficacy in the presence of soil was tested by mixing 1 ml of test disinfectant with 1 ml of 5% bovine calf serum in hard water and immediately adding a biofilm coated coupon for 5 minutes contact time prior to the addition of 1 ml of neutralizer.

Positive (biofilm covered coupons) and negative (clean sterile coupons) control were subjected to the same treatments as described above but test disinfectants were replaced with hard water. Confirmation that disinfectant activity was completely inactivated by the addition of 1 ml of neutraliser was tested by adding 1 ml of neutraliser to test mixture (1 ml disinfectant plus 1 ml of either soil or hard water), immediately adding a biofilm covered coupon and reacting for 5 minutes (results not shown).

Determination of residual biofilm viability was determined by subjecting control and test coupons to sonication at 80 kHz for 20 minutes prior to serial 10-fold dilution and overnight plate culture at 37° C. and CFU determination.

Results

Positive control coupons had a mean of $2.6 \times 10^6$ CFU/coupon.

In the absence of biological soil, and with a five minutes contact time, example 9 was observed to give a 6.42 $\log_{10}$ reduction, whilst the diluted Proxitane sample gave only a 2.04 $\log_{10}$ reduction. The chlorine-based disinfectants, SDIC and Chlorclean reduced biofilm viability by 2.85 $\log_{10}$ and 2.82 $\log_{10}$ respectively. Oxivir was found to give approximately a 1 $\log_{10}$ reduction whereas the unformulated hydrogen peroxide gave essentially a zero $\log_{10}$ reduction under both clean and dirty conditions.

Figure 9:
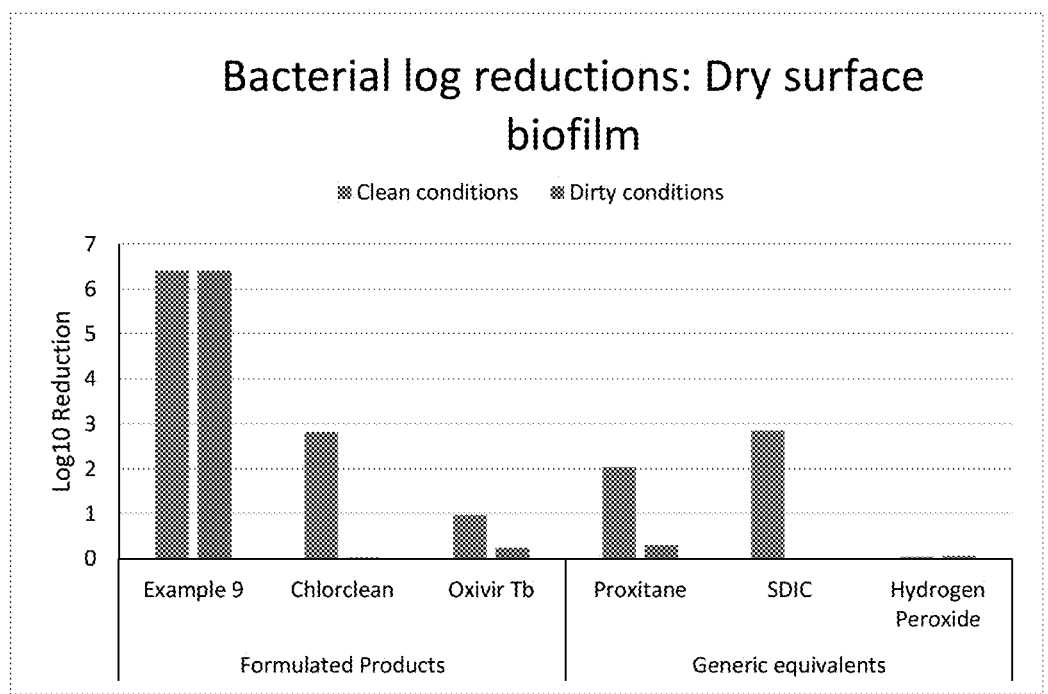
FIG. 9 shows the bacterial reduction of a range of disinfectants against dry surface biofilms formed by *Staphylococcus aureus*.

Under dirty conditions (ie in the presence of an organic soil), Example 9 again gave a 6.42 $\log_{10}$ reduction. Both SDIC and Chlorclean disinfectant efficacy was significantly decreased in the presence of soil, giving $\log_{10}$ reductions of 0.03 and 0.02 respectively. Oxivir Tb also gave a reduced efficacy, giving a 0.24 $\log_{10}$ reduction of biofilm viability (See FIG. 9).

Conclusions

The disinfectant solution according to Example 9, along with two other formulated, commercially available disinfectant systems, each of which contained an oxidising biocide, along with other ingredients such as surfactants. The effect of addition of the proprietary ingredients to disinfectant efficacy was evaluated by comparing the formulated disinfectants with generic equivalents in a bid to determine if biofilm removal is due to the active ingredient alone or if proprietary ingredients act in synergism with the active ingredient.

The outstanding performer in this study was Example 9 which completely inactivated the Dry Surface Biofilm in the presence or absence of soil.

The formulated chlorine-based product Chlorclean, as well as unformulated SIDC tablets were the next best performers, although they killed significantly less biofilm bacteria (3 $\log_{10}$) than Example 9, and only in the absence of soil.

Previous studies have demonstrated that, chemicals such as hypochlorite are consumed by the surface layers of the biofilm causing depletion of the neutralizing capacity before the disinfectant can penetrate into deeper layers (see reference 13) making traditional hydrated biofilm more tolerant than planktonic cells to these disinfectants. However, a study on the efficacy of hypochlorite against Dry Surface Biofilm found that this semi-dehydrated biofilm was more tolerant to hypochlorite than traditional hydrated biofilm (see reference 6).

Even in the absence of soil, the hydrogen peroxide-based disinfectants killed significantly less biofilm bacteria than disinfectants based on chlorine or a combination of peracetic acid and hydrogen peroxide. Oxivir Tb killed approximated 1 $\log_{10}$ of the biofilm bacteria while hydrogen peroxide solution had no effect. It is noted however that Oxivir's manufacturer's recommended contact time for killing bacteria is 10 not five minutes as used in the study and this could explain its lower performance. However, even a contact time of 5 minutes is probably excessive given the way that dry hospital surfaces are cleaned. The majority of disinfectants have no residual effect and remain active only when wet.

The differences in kill rate between Example 9 (formulated additives) and diluted Proxitane (no additives) suggests that the activity of Example 9 against DSB may be governed not only by the active ingredients (hydrogen peroxide and peracetic acid), but also by other factors such as the added surfactants or excipients, chelating agents or its solution pH.

Surfactants may increase diffusion of the active ingredients into the biofilm (due to a lowering of the solution surface tension, and hence improved wetting of the biofilm surface).

Increased diffusion is likely to result in increased biofilm kill as all these tested disinfectants, in the absence of organic soil, can kill 7 $\log_{10}$ of planktonic organisms. Chelating agents complex any calcium and magnesium ions present in the hard water, plus any other interfering metals often present in tap water such as iron, manganese and thus increase disinfectant performance in hard water.

REFERENCES

1. Vickery K, Deva A, Jacombs A, Allan J, Valente P, Gosbell I B; "Presence of biofilm containing viable multiresistant organisms despite terminal cleaning on clinical surfaces in an intensive care unit"; Journal of Hospital Infection, (2012) 80, 52-55
2. Hu H, Johani K, Gosbell I B, Jacombs A S, Almatroudi A, Whiteley G S, Deva A K, Jensen S, Vickery K; "Intensive care unit environmental surfaces are contaminated by multidrug-resistant bacteria in biofilms: combined results of conventional culture, pyrosequencing, scanning electron microscopy, and confocal laser microscopy"; Journal of Hospital Infection. (2015) 91, 35-44
3. Whiteley G S, Knight J L, Derry C W, Jensen S O, Vickery K, Gosbell I B; A pilot study into locating the bad bugs in a busy intensive care unit" American Journal of Infection Control, (2015) 43, 1270-1275
4. Almatroudi A, Hu H, Deva A, Gosbell IB, Jacombs A, Jensen SO, Whiteley G, Glasbey T, Vickery K; "A new dry surface biofilm model: An essential tool for efficacy testing of hospital decontamination procedures"; Journal of Microbiological Methods; (2015), 117, 171-176
5. "Standard test method for quantification of *Pseudomonas aeruginosa* biofilm grown with high shear and continuous flow using CDC biofilm reactor". ASTM E2562-12. ASTM International, West Conshohocken
6. Almatroudi A, Gosbell I B, Hu H, Jensen S O, Espedido B A, Tahir S, Glasbey T O, Legge P, Whiteley G, Deva A, Vickery K. "*Staphylococcus aureus* dry-surface biofilms are not killed by sodium hypochlorite: implications for infection control"; Journal of Hospital Infection, (2016), 93, 263-270

7. Almatroudi A, Tahir S, Hu H, Chowdhury D, Gosbell I B, Jensen S O, Whiteley G S, Deva A K, Glasbey T, Vickery K.; "*Staphylococcus aureus* dry surface biofilms are more resistant to heat treatment than traditional hydrated biofilms", Journal of Hospital Infection (2018), 98, 161-167
8. Vickery K, Pajkos A, Cossart Y.; "Removal of biofilm from endoscopes: Evaluation of detergent efficiency"; American Journal of Infection Control (2004), 32, 170-176
9. Vickery K, Ngo Q D, Zou J, Cossart Y E.; "The effect of multiple cycles of contamination, detergent washing, and disinfection on the development of biofilm in endoscope tubing"; American Journal of Infection Control (2009), 37, 470-475
10. Ren W, Sheng X, Huang X, Zhi F, Cai W. "Evaluation of detergents and contact time on biofilm removal from flexible endoscopes"; American Journal of Infection Control (2013), 41, e89-e92
11. Ying Fang, Zhe Shen, Lan Li, Yong Cao, Li-Ying Gu, Qing Gu, Xiao-Qi Zhong, Chao-Hui Yu, and You-Ming Li "A study of the efficacy of bacterial biofilm cleanout for gastrointestinal endoscopes" World Journal of Gastroenterology (2010), 16, 1019-1024
12. Goeres D M, Loetterle L R, Hamilton M A, Murga R, Kirby D W, Donlan R M.; "Statistical assessment of a laboratory method for growing biofilms"; Microbiology (2005) 151, 757-762
13. Chen X, P S Stewart. "Chlorine penetration into artificial biofilm is limited by a reaction-diffusion interaction". Environ Sci Technol 1996; 30: 2078-83

The invention claimed is:

1. A process for removing dry surface biofilm from a contaminated environmental surface or a contaminated non-critical medical device, said dry surface biofilm comprising embedded bacteria and protein and being formed by dehydration of biofilm, which process comprises:
dissolving a single-part powder-based composition into water to produce a solution, wherein the powder-based composition consists essentially of:
a) a hydrogen peroxide source,
b) an acetyl donor,
c) an acidifying agent, and
d) a surfactant;
(ii) allowing the solution to generate peracetic acid in a concentration of at least 0.13%;
(iii) contacting the contaminated environmental surface or the contaminated non-critical medical device with the solution containing said generated peracetic acid for a period of time sufficient to kill said embedded bacteria and remove a portion of said protein present in said dry surface biofilm; and
(iv) removing the solution and said dry surface biofilm from the contaminated environmental surface or the contaminated non-critical medical device.

2. A process according to claim 1 wherein the powder-based composition additionally comprises one or more ingredients selected from the group consisting of a sequestering agent, a buffering agent, a flow modifier, a colourant and a perfume.

3. A process according to claim 1 wherein the solution is removed by rinsing off or wiping off.

4. A process according to claim 1 wherein the hydrogen peroxide source is selected from the group consisting of sodium perborate, sodium percarbonate, urea peroxide, povidone-hydrogen peroxide, calcium peroxide, hydrogen peroxide solution, and combinations thereof.

5. A process according to claim 1 wherein the acetyl donor is selected from the group consisting of tetraacetylethylenediamine (TAED), N-acetyl caprolactam, N-acetyl succinimide, N-acetyl phthalimide, N-acetyl maleimide, pentaacetyl glucose, octaacetyl sucrose, acetylsalicylic acid, tetraacetyl glycouril, and combinations thereof.

6. A process according to claim 1 wherein the acidifying agent is selected from the group consisting of citric acid, monosodium citrate, disodium citrate, tartaric acid, monosodium tartrate, sulfamic acid, sodium hydrogen sulphate, monosodium phosphate, oxalic acid, benzoic acid, benzenesulfonic acid, toluene sulfonic acid and combinations thereof.

7. A process according to claim 1 wherein the surfactant is selected from the group consisting of sodium dodecyl sulphate, Pluronic PE6800, Hyamine 1620 etc, and combinations thereof.

8. A process according to claim 2 wherein the sequestering agent is selected from the group consisting of sodium citrate, citric acid, phosphoric acid, sodium tripolyphosphate, EDTA, NTA, and combinations thereof.

9. A process according to claim 2 wherein the buffering agent is selected from the group consisting of phosphate, borate, bicarbonate, TAPS (3-{[tri s(hydroxymethyl)methyl]amino}propanesulfonic acid), Bicine (N,N-bis(2-hydroxyethyl)glycine), Tris (tris(hydroxymethyl)methylamine), Tricine (N-tris(hydroxymethyl)methylglycine) and combinations thereof.

10. A process according to claim 1 wherein the contaminated environmental surface or the contaminated non-critical medical device is contacted with the solution for at least 5 minutes.

11. A process according to claim 1 wherein the powder-based composition further comprises a peracetic acid bleachable dye that discharges color when the solution reaches and obtains the concentration of peracetic acid of at least 0.13%.

12. A process according to claim 11 wherein the peracetic acid bleachable dye is a 1-arylazo-2-hydroxynaphthyl dye.

13. A process according to claim 12 wherein the peracetic acid bleachable dye is selected from the group consisting of Amaranth (CI 16185), Ponceau 4R (CI 16255), or any other 1-arylazo-2-hydroxynaphthyl dye, and combinations thereof.

14. A process according to claim 11 wherein the powder-based composition further comprises a substantially bleach-stable dye.

15. A process according to claim 14 wherein the substantially bleach-stable dye is selected from the group consisting of Acid Blue 182, Acid Blue 80, Direct Blue 86, Acid Green 25 (CI 61570), and combinations thereof.

16. A process for removing dry surface biofilm from a contaminated environmental surface or a contaminated non-critical medical device, said dry surface biofilm comprising embedded bacteria and protein and being formed by dehydration of said bacteria, which process comprises:
dissolving a single-part powder-based composition into water to produce a solution, wherein the powder-based composition consists of:
a) a hydrogen peroxide source,
b) an acetyl donor,
c) an acidifying agent,
d) a surfactant, and
e) optionally one or more ingredients selected from the group consisting of a sequestering agent, a buffering agent, a flow modifier, a colourant and a perfume;

(ii) allowing the solution to generate peracetic acid in a concentration of at least 0.13%;
(iii) contacting the contaminated environmental surface or the contaminated non-critical medical device with the solution containing said generated peracetic acid for a period of time sufficient to kill said embedded bacteria and remove a portion of said protein present in said dry surface biofilm; and
(iv) removing the solution and said dry surface biofilm from the contaminated environmental surface or the contaminated non-critical medical device.

17. A process according to claim 16 wherein the powder-based composition includes one or more colourants, and wherein the one or more colourants include a peracetic acid bleachable dye that discharges color when the solution reaches and obtains the concentration of peracetic acid of at least 0.13%.

18. A process according to claim 16 wherein the contaminated environmental surface or the contaminated non-critical medical device is contacted with the solution for at least 5 minutes.

* * * * *